US012794530B2

United States Patent

(12) United States Patent
Ryu et al.

(10) Patent No.: US 12,794,530 B2
(45) Date of Patent: Nov. 10, 2026

(54) CHANNEL STATE INFORMATION FRAMEWORK FOR FULL-DUPLEX OPERATIONS

(71) Applicant: QUALCOMM Incorporated, San Diego, CA (US)

(72) Inventors: Jae Ho Ryu, San Diego, CA (US); Lei Xiao, San Jose, CA (US); Muhammad Sayed Khairy Abdelghaffar, San Jose, CA (US); James Beckman, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 18/458,664

(22) Filed: Aug. 30, 2023

(65) Prior Publication Data

US 2024/0380458 A1 Nov. 14, 2024

Related U.S. Application Data

(60) Provisional application No. 63/500,923, filed on May 9, 2023.

(51) Int. Cl.
*H04B 7/06* (2006.01)
*H04B 17/336* (2015.01)

(52) U.S. Cl.
CPC ......... *H04B 7/0626* (2013.01); *H04B 17/336* (2015.01)

(58) Field of Classification Search
None
See application file for complete search history.

(56) References Cited

U.S. PATENT DOCUMENTS

| | | | | |
|---|---|---|---|---|
| 2021/0328738 | A1* | 10/2021 | Mondal | H04L 5/0053 |
| 2022/0141852 | A1 | 5/2022 | Zhang et al. | |
| 2023/0130732 | A1 | 4/2023 | Ibrahim et al. | |
| 2024/0178967 | A1* | 5/2024 | Mohandoss | H04L 5/0048 |
| 2025/0184789 | A1* | 6/2025 | Noh | H04W 72/231 |

FOREIGN PATENT DOCUMENTS

| | | | |
|---|---|---|---|
| WO | 2017029292 | A1 | 2/2017 |
| WO | 2023158943 | | 8/2023 |
| WO | 2024034440 | A1 | 2/2024 |

OTHER PUBLICATIONS

International Search Report and Written Opinion—PCT/US2024/024603—ISA/EPO—Jul. 15, 2024.

* cited by examiner

*Primary Examiner* — Minh Ttang T Nguyen
(74) *Attorney, Agent, or Firm* — Harrity & Harrity LLP

(57) ABSTRACT

Various aspects of the present disclosure generally relate to wireless communication. Some aspects relate to a channel state information (CSI) framework for full-duplex operations of a network node. Some aspects more specifically relate to a CSI configuration that includes one or more separate elements for calculating CSI associated with downlink time intervals and for calculating CSI associated with full-duplex time intervals. In some aspects, the CSI configuration may include separate channel measurement resources and/or separate interference measurement resources for calculating CSI associated with downlink time intervals and for calculating CSI associated with full-duplex time intervals. In some aspects, a network node may configure a user equipment with a common CSI reporting configuration or a separate CSI reporting configuration.

30 Claims, 15 Drawing Sheets

400

1000

| | Antenna Configuration 1 | | Antenna Configuration 2 | |
|---|---|---|---|---|
| **CLI** | Good | Poor | Good | Poor |
| **CSI-RS configuration** | Common CSI-RS | Common CSI-RS | Separate CSI-RSs | Separate CSI-RSs |
| **IMR configuration** | Common IMR | Separate IMRs | Common IMR | IMR configuration |
| **CMR for DL** | Common CSI-RS | Common CSI-RS | DL CSI-RS | DL CSI-RS |
| **IMR for DL** | Common IMR | DL IMR | Common IMR | DL IMR |
| **CMR for FD** | Common CSI-RS | Common CSI-RS | FD CSI-RS | FD CSI-RS |
| **IMR for FD** | Common IMR | FD IMR | Common IMR | FD IMR |
| **Separate CSI reporting** | No | Yes | Yes | Yes |

FIGURE 10

CHANNEL STATE INFORMATION FRAMEWORK FOR FULL-DUPLEX OPERATIONS

CROSS-REFERENCE TO RELATED APPLICATION

This patent application claims priority to U.S. Provisional Patent Application No. 63/500,923, filed on May 9, 2023, entitled "CHANNEL STATE INFORMATION FRAMEWORK FOR FULL-DUPLEX OPERATIONS" and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses associated with a channel state information (CSI) framework for full-duplex operations.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, system bandwidth and/or device transmit power). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies, massive multiple-input multiple-output (MIMO), disaggregated network architectures and network topology expansions, multiple-subscriber implementations, and/or high-precision positioning, among other examples. As the demand for mobile broadband access continues to increase, further improvements in NR may be implemented, and other radio access technologies, such as 6G, may be introduced to further advance mobile broadband evolution.

A user equipment (UE) may be configured to report channel state information (CSI) associated with a channel. The CSI may include a channel quality indicator (CQI), a precoding matrix indicator (PMI), a CSI reference signal (CSI-RS) resource indicator (CRI), a synchronization signal block resource indicator (SSBRI), a layer indicator (LI), a rank indicator (RI), and/or a reference signal receive power (RSRP), among other examples. For example, the UE may measure a downlink reference signal (for example, that is transmitted by a network node). The UE may determine or calculate the CSI based on, or otherwise associated with, one or more measurements of the downlink reference signal.

In some examples, a network node may operate in a full-duplex mode (for example, may transmit and receive communications at the same time). To improve spatial isolation of antennas used for respective communication directions, the network node may use different antenna configurations and/or different radio frequency (RF) chain configurations when operating in a full-duplex mode as compared to a non-full-duplex mode. For example, when using a first antenna configuration or a first RF chain configuration and during downlink time intervals (for example, downlink slots), the network node may use a set of antenna panels and/or a set of RF chains to transmit signals. During full-duplex time intervals, the network node may use a subset of antenna panels (from the set of antenna panels) and/or a subset of RF chains (from the set of RF chains) to transmit signals. As a result, the RF chains, antenna panels, and/or antenna elements used by the network node to transmit signals may be different during downlink time intervals as compared to full-duplex time intervals. As a result, if a UE applies measurements performed during a first type of time interval (for example, downlink time intervals or full-duplex time intervals) for estimating a channel or calculating CSI for a second type of time interval (for example, the other of downlink time intervals or full-duplex time intervals), then the estimated channel and/or calculated CSI may be inaccurate. For example, because of the different RF chains, antenna elements, and/or antenna panels used by the network node, there may be a difference between a downlink channel during downlink time intervals and the downlink channel during full-duplex time intervals.

In other examples, the network node may use the same RF chains, the same antenna panels, and/or the same antenna elements for transmitting downlink signals during full-duplex time intervals and during downlink time intervals. For example, the network node may use one or more antenna panels for transmitting downlink signals during both full-duplex time intervals and downlink time intervals. In such examples, a UE receiving downlink signals from the network node may apply measurements performed during a first type of time interval (for example, downlink time intervals or full-duplex time intervals) for estimating a channel or calculating CSI for a second type of time intervals (for example, the other of downlink time intervals or full-duplex time intervals).

However, the UE may be unaware of the antenna configuration and/or the RF chain configuration of the network node. For example, the UE may be aware of an antenna array size, but may not be aware of an RF chain implementation of the network node. The UE may perform measurements (for example, CSI measurements) during a downlink time interval and apply the CSI measurements to calculate CSI for a full-duplex time interval. In some examples, such as when the network node uses different RF chains, antenna panels, and/or antenna elements for downlink time intervals and full-duplex time intervals, this may result in an inaccurate CSI calculation. Using inaccurate CSI may degrade the performance of communications between the UE and the network node. Additionally, interference conditions may be different during downlink time intervals and full-duplex time intervals. For example, during downlink time intervals, the UE may experience interference caused by transmissions from neighboring cells. However, during full-duplex time intervals, the UE may also experience cross-link interference (CLI) from transmissions by other UEs. As a result, an interference measurement resource (IMR) used to measure interference during a downlink time interval may not be useful for interference measurements during a full-duplex time interval (for example, because the source of interference is different).

SUMMARY

Some aspects described herein relate to a user equipment (UE) for wireless communication. The UE may include a processing system. The processing system may include one or more processors and one or more memories coupled with the one or more processors. The processing system may be configured to cause the UE to receive, from a network node, configuration information indicating at least one of: a first channel state information (CSI) resource configuration associated with full-duplex time intervals and a second CSI resource configuration associated with downlink time intervals, or a first interference measurement resource (IMR) configuration associated with the full-duplex time intervals and a second IMR configuration associated with the downlink time intervals. The processing system may be configured to cause the UE to transmit, to the network node, a first CSI report indicating first CSI associated with the downlink time intervals in accordance with the configuration information. The processing system may be configured to cause the UE to transmit, to the network node, a second CSI report indicating second CSI associated with the full-duplex time intervals in accordance with the configuration information.

Some aspects described herein relate to a network node for wireless communication. The network node may include a processing system. The processing system may include one or more processors and one or more memories coupled with the one or more processors. The processing system may be configured to cause the network node to transmit configuration information, associated with a UE, indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals. The processing system may be configured to cause the network node to receive a first CSI report, associated with the UE, indicating first CSI associated with the downlink time intervals in accordance with the configuration information. The processing system may be configured to cause the network node to receive a second CSI report, associated with the UE, indicating second CSI associated with the full-duplex time intervals in accordance with the configuration information.

Some aspects described herein relate to a method for wireless communication by a UE. The method may include receiving, from a network node, configuration information indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals. The method may include transmitting, to the network node, a first CSI report indicating first CSI associated with the downlink time intervals in accordance with the configuration information. The method may include transmitting, to the network node, a second CSI report indicating second CSI associated with the full-duplex time intervals in accordance with the configuration information.

Some aspects described herein relate to a method for wireless communication by a network node. The method may include transmitting configuration information, associated with a UE, indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals. The method may include receiving a first CSI report, associated with the UE, indicating first CSI associated with the downlink time intervals in accordance with the configuration information. The method may include receiving a second CSI report, associated with the UE, indicating second CSI associated with the full-duplex time intervals in accordance with the configuration information.

Some aspects described herein relate to a non-transitory computer-readable medium that stores a set of instructions for wireless communication by a UE. The set of instructions, when executed by one or more processors of the UE, may cause the UE to receive, from a network node, configuration information indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals. The set of instructions, when executed by one or more processors of the UE, may cause the UE to transmit, to the network node, a first CSI report indicating first CSI associated with the downlink time intervals in accordance with the configuration information. The set of instructions, when executed by one or more processors of the UE, may cause the UE to transmit, to the network node, a second CSI report indicating second CSI associated with the full-duplex time intervals in accordance with the configuration information.

Some aspects described herein relate to a non-transitory computer-readable medium that stores a set of instructions for wireless communication by a network node. The set of instructions, when executed by one or more processors of the network node, may cause the network node to transmit configuration information, associated with a UE, indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals. The set of instructions, when executed by one or more processors of the network node, may cause the network node to receive a first CSI report, associated with the UE, indicating first CSI associated with the downlink time intervals in accordance with the configuration information. The set of instructions, when executed by one or more processors of the network node, may cause the network node to receive a second CSI report, associated with the UE, indicating second CSI associated with the full-duplex time intervals in accordance with the configuration information.

Some aspects described herein relate to an apparatus for wireless communication. The apparatus may include means for receiving, from a network node, configuration information indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals. The apparatus may include means for transmitting, to the network node, a first CSI report indicating first CSI associated with the downlink time intervals in accordance with the configuration information. The apparatus may include means for transmitting, to the network node, a second CSI report indicating second CSI associated with the full-duplex time intervals in accordance with the configuration information.

Some aspects described herein relate to an apparatus for wireless communication. The apparatus may include means for transmitting configuration information, associated with a UE, indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals. The apparatus may include means for receiving a first CSI report, associated with the UE, indicating first CSI associated with the downlink time intervals in accordance with the configuration information. The apparatus may include means for receiving a second CSI report, associated with the UE, indicating second CSI associated with the full-duplex time intervals in accordance with the configuration information.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The appended drawings illustrate some aspects of the present disclosure, but are not limiting of the scope of the present disclosure because the description may enable other aspects. The same reference numbers in different drawings may identify the same or similar elements.

FIG. 10 is a diagram of an example associated with a table showing different CSI configurations for downlink and full-duplex in accordance with the present disclosure.

DETAILED DESCRIPTION

Figure 1:
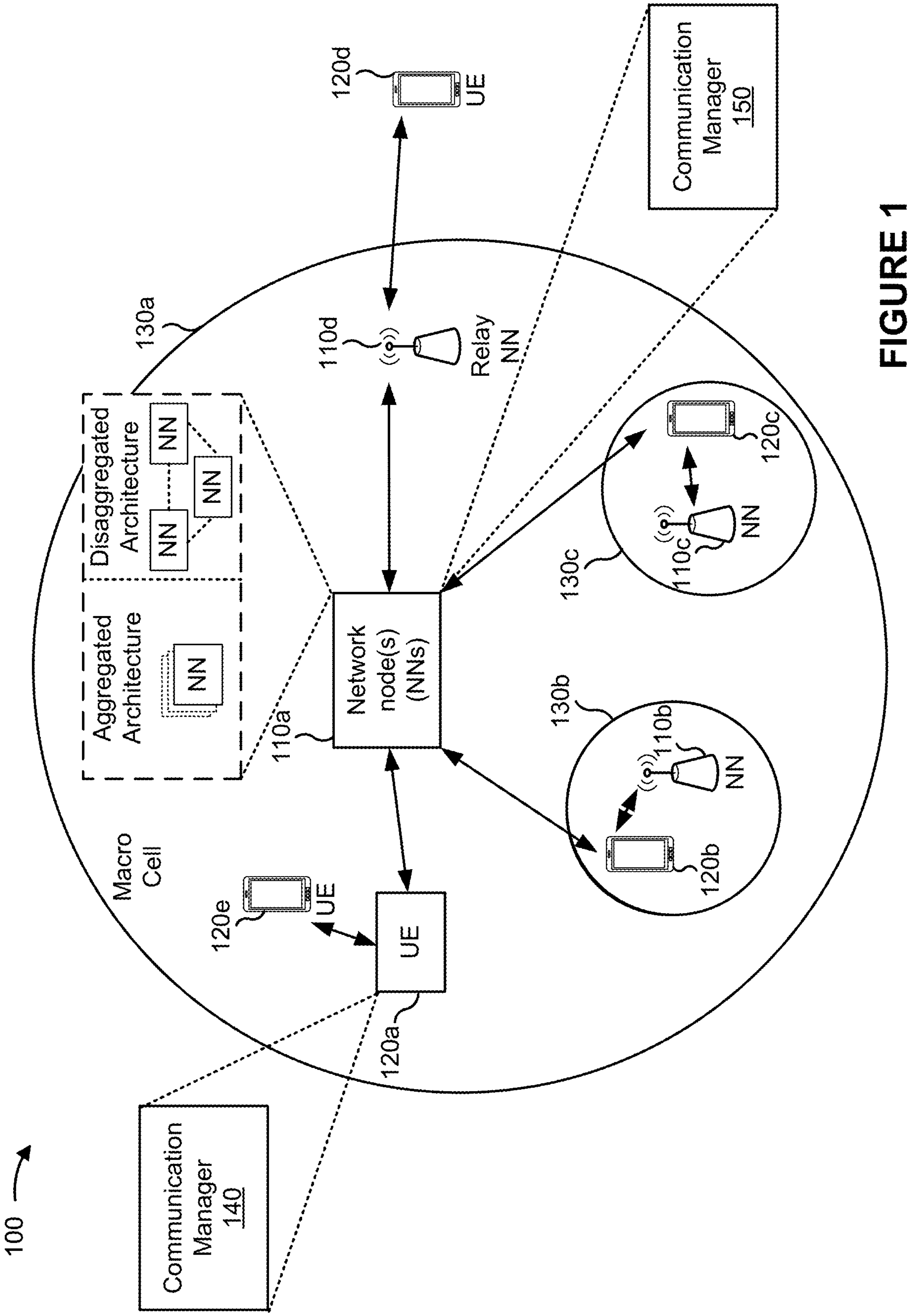
FIG. 1 is a diagram illustrating an example of a wireless network in accordance with the present disclosure.

Various aspects of the disclosure are described hereinafter with reference to the accompanying drawings. However, this disclosure may be embodied in many different forms and is not to be construed as limited to any specific aspect presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using any quantity of the aspects set forth herein. In addition, the scope of the disclosure is intended to cover an apparatus or method that is practiced using another structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to a channel state information (CSI) framework for full-duplex operations of a network node. Some aspects more specifically relate to a CSI configuration that includes one or more separate elements for calculating CSI associated with downlink time intervals and for calculating CSI associated with full-duplex time intervals. In some aspects, the CSI configuration may include separate channel measurement resources (CMRs) and/or separate interference measurement resources (IMRs) for calculating CSI associated with downlink time intervals and for calculating CSI associated with full-duplex time intervals. For example, a network node may configure a user equipment (UE) with a common CSI reporting configuration or a separate CSI reporting configuration. The UE may calculate CSI of a downlink channel associated with downlink time intervals using one or more reference signal resources that are configured as common resources or that are configured as being associated with CSI calculations for downlink time intervals. Additionally, the UE may calculate CSI of the downlink channel associated with full-duplex time intervals using one or more reference signal resources that are configured as common resources or that are configured as being associated with CSI calculations for full-duplex time intervals. In some aspects, the UE may transmit separate CSI reports for the downlink channel associated with downlink time intervals and full-duplex time intervals (for example, a first CSI report may indicate CSI of the downlink channel associated with downlink time intervals and a second CSI report may indicate CSI of the downlink channel associated with full-duplex time intervals).

In some aspects, the network node may configure separate CSI resources for downlink time interval CSI calculations and full-duplex time interval calculations. In other aspects, the network node may configure a CSI resource for downlink time interval CSI calculations. The CSI resource may be configured with a set of resources (for example, a set of CSI reference signal (CSI-RS) ports). The network node may configure a subset of resources from the set of resources (for example, a subset of CSI-RS ports) to be associated with full-duplex time interval CSI calculations.

Particular aspects of the subject matter described in this disclosure can be implemented to realize one or more of the following potential advantages. In some examples, the described techniques can be used to improve the accuracy of CSI calculations performed by the UE. For example, by being configured with separate CSI reporting configurations for full-duplex time interval CSI calculations and downlink time interval CSI calculations, the UE may calculate CSI using resources (for example, antenna ports, CSI-RS ports, and/or antenna configurations) that will be used by the network node during respective types of time intervals. This may result in more accurate CSI calculations for the downlink channel during different time intervals. Improving the accuracy of the CSI calculations may improve communication performance between the UE and the network node (for example, by enabling the network node to make determinations that are based on, responsive to, or otherwise associated with the more accurate CSI). Additionally, by configuring a CSI resource for full-duplex time interval CSI calculations from a set of resources of a CSI resource for downlink time interval CSI calculations, network resources and/or configuration overhead may be conserved (for example, because the network node may only transmit a single CSI-RS and the UE may measure and/or calculate the CSI using respective resources configured for the different types of time intervals).

FIG. 1 is a diagram illustrating an example of a wireless network 100 in accordance with the present disclosure. The wireless network 100 may be or may include elements of a 5G (or NR) network or a 6G network, among other examples. The wireless network 100 may include multiple network nodes 110 (also referred to as network entities), shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

A network node 110 may include one or more devices that enable communication between a UE 120 and one or more components of the wireless network 100. A network node 110 may be, may include, or may be referred to as an NR network node, a 6G network node, a Node B, an eNB (for example, in 4G), a gNB (for example, in 5G), an access point (AP), a transmission reception point (TRP), a mobility element of a network, a core network node, a network element, a network equipment, and/or another type of device or devices included in a radio access network (RAN).

A network node 110 may be a single physical node or may be two or more physical nodes. For example, a network node 110 may be a device or system that implements part of a radio protocol stack, a device or system that implements a full protocol stack (such as a full gNB protocol stack), or a collection of devices or systems that collectively implement the full protocol stack. For example, and as shown, a network node 110 may be an aggregated network node, meaning that the network node 110 may use a radio protocol stack that is physically and logically integrated within a single node in the wireless network 100. For example, an aggregated network node 110 may consist of a single standalone base station or a single TRP that uses a full radio protocol stack to enable or facilitate communication between a UE 120 and a core network of the wireless network 100.

Alternatively, and as also shown, a network node 110 may be a disaggregated network node (sometimes referred to as a disaggregated base station), meaning that the network node 110 may use a protocol stack that is physically distributed and/or logically distributed among two or more nodes in the same geographic location or in different geographic locations. In some deployments, disaggregated network nodes 110 may be used in an integrated access and backhaul (IAB) network, in an open radio access network (O-RAN), such as the network configuration sponsored by the O-RAN Alliance, or in a virtualized radio access network (vRAN), also known as a cloud radio access network (C-RAN), to facilitate scaling of communication systems by separating base station functionality into multiple units that can be individually deployed.

The network nodes 110 of the wireless network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more high physical (PHY) layers depending, at least in part, on a functional split, such as a functional split defined by the Third Generation Partnership Project (3GPP). In some examples, a DU may host one or more low PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or low PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a network node 110 may include a combination of one or more CUs, one or more DUs, one or more RUs, one or more IAB nodes, one or more Near-Real Time (Near-RT) RAN Intelligent Controllers (RICs), and/or one or more Non-Real Time (Non-RT) RICs in the wireless network 100. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as within a cloud deployment.

In some examples, a network node 110 may be, may include, or may operate as an RU, a TRP, or a base station that communicates with one or more UEs 120 via a radio access link (which may be referred to as a “Uu” link). The radio access link may include a downlink and an uplink. “Downlink” (or “DL”) refers to a communication direction from a network node 110 to a UE 120, and “uplink” (or “UL”) refers to a communication direction from a UE 120 to a network node 110. Downlink channels may include one or more control channels and one or more data channels. A downlink control channel may be used to transmit downlink control information (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may include one or more control channels and one or more data channels. An uplink control channel may be used to transmit uplink control information (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

In some examples, the wireless network 100 may be configured for half-duplex operation and/or full-duplex operation. In half-duplex operation, a network node 110 and/or a UE 120 may only transmit or receive communications during particular time periods, such as during particular slots, symbols, or other time periods. Half-duplex operation may involve time-division duplexing (TDD), in which transmissions of the network node 110 and transmissions of the UE 120 do not occur in the same time periods (that is, the transmissions do not overlap in time). For example, in half-duplex operation, a wireless communication device may perform only one of transmission or reception in a particular time period. In full-duplex operation, a wireless communication device (such as the network node 110 and/or the UE 120) may transmit and receive communications concurrently (for example, in the same time period). In some examples, full-duplex operation may involve frequency-division duplexing (FDD), in which transmissions of the network node 110 are performed on a first frequency and transmissions of the UE 120 are performed on a second frequency different from the first carrier. In FDD, transmissions of the network node 110 and transmissions of the UE 120 can be performed concurrently. In some examples, a UE 120 may communicate with two network nodes 110 in a configuration that may be referred to as a multi-TRP (mTRP) configuration. In some examples, full-duplex operation may be enabled for a UE 120 but not for a network node 110. For example, a UE 120 may simultaneously transmit an UL transmission to a first network node 110 and receive a DL transmission from a second network node 110 in the same time instance. In some other examples, full-duplex operation may be enabled for a network node 110 but not for a UE 120. For example, a network node 110 may simultaneously transmit a DL transmission to a first UE 120 and receive an UL transmission from a second UE 120 in the same time instance. In some examples, full-duplex operation may be enabled for both a network node 110 and a UE 120. Full-duplex operation increases the capacity of the network and the radio access link.

In some examples, the UE 120 and the network node 110 may perform MIMO communication. “MIMO” generally refers to transmitting and receiving multiple data signals (such as multiple layers or multiple data streams) simultaneously over a radio channel. MIMO may exploit multipath propagation. MIMO may be implemented using spatial processing referred to as precoding, or MIMO may be implemented using spatial multiplexing. In some examples, MIMO may support simultaneous transmission to multiple receivers, referred to as multi-user MIMO (MU-MIMO). Some radio access technologies (RATs) may employ advanced MIMO techniques, such as multiple TRP operation (including redundant transmission or reception on multiple TRPs), reciprocity in the time domain or the frequency domain, single-frequency-network (SFN) transmission, or non-coherent joint transmission (NC-JT).

As described above, in some aspects, the wireless network 100 may be, may include, or may be included in an IAB network. In an IAB network, at least one network node 110 may be an anchor network node that communicates with a core network via a wired backhaul link, such as a fiber connection. An anchor network node 110 may also be referred to as an IAB donor (or IAB-donor), a central entity, and/or a CU, among other examples. An IAB network may include one or more non-anchor network nodes 110, sometimes referred to as relay network nodes or IAB nodes (or IAB-nodes). The non-anchor network node 110 may communicate directly with or indirectly with (for example, via one or more non-anchor network nodes) the anchor network node 110 via one or more backhaul links to form a backhaul path to the core network for carrying backhaul traffic. In various deployments, the backhaul links may be wireless links. Anchor network nodes 110 and/or non-anchor network nodes 110 may also communicate directly with one or more UEs 120 via access links, which may be wireless links for carrying access traffic.

As described above, an IAB network includes an IAB donor that may connect to a core network via a wired connection (for example, a wireline backhaul). For example, an Ng interface of an IAB donor may terminate at a core network. Additionally, or alternatively, an IAB donor may connect to one or more devices of the core network that provide a core access and mobility management function (AMF). As described above, an IAB donor may include a CU, which may perform access node controller (ANC) functions and/or AMF functions. The CU may configure a DU of the IAB donor and/or may configure one or more IAB nodes (for example, a mobile termination (MT) function and/or a DU function of an IAB node) that connect to the core network via the IAB donor. A link between an IAB donor and an IAB node or between two IAB nodes may also be referred to as a backhaul link. In some examples, a backhaul link between an IAB donor and an IAB node or between two IAB nodes may be a wireless backhaul link that provides an IAB node with radio access to a core network via an IAB donor, and optionally via one or more other IAB nodes. Thus, a CU of an IAB donor may control and/or configure the entire IAB network (or a portion thereof) that connects to the core network via the IAB donor, such as by using control messages and/or configuration messages (for example, an RRC configuration message or an F1 application protocol (F1AP) message). Access links may facilitate communications between a UE 120 and an IAB donor or between a UE 120 and an IAB node. For example, network resources for wireless communications (such as time resources, frequency resources, and/or spatial resources) may be shared between access links and backhaul links. A backhaul link may be a primary backhaul link or a secondary backhaul link (for example, a backup backhaul link). In some aspects, a secondary backhaul link may be used if a primary backhaul link fails, becomes congested, and/or becomes overloaded, among other examples.

When a first IAB node controls and/or schedules communications for a second IAB node (for example, when the first IAB node provides DU functions for the MT functions of the second IAB node), the first IAB node may be referred to as a parent IAB node of the second IAB node, and the second IAB node may be referred to as a child IAB node of the first IAB node. A child IAB node of the second IAB node may be referred to as a grandchild IAB node of the first IAB node. Thus, a DU function of a parent IAB node may control and/or schedule communications for child IAB nodes of the parent IAB node. In some examples, a DU function may exercise limited control over communications of a grandchild node, such as via indication of soft resources or restricted beams at a child node associated with the grandchild node. In some examples, in an IAB network, a DU may be referred to as a scheduling node or a scheduling component, and an MT may be referred to as a scheduled node or a scheduled component. A parent IAB node may be an IAB donor or an IAB node, and a child IAB node may be an IAB node or a UE 120. Communications of an MT function of a child IAB node may be controlled and/or scheduled by a parent IAB node of the child IAB node.

The UEs 120 may be physically dispersed throughout the wireless network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 may include or may be included in a housing that houses components associated with the UE 120, such as one or more processor components and/or one or more memory components. One or more of the processor components may be coupled with one or more of the memory components and/or other components. For example, the processor components (for example, one or more processors) and the memory components (for example, one or more memories) may be operatively coupled, communicatively coupled, electronically coupled, or electrically coupled with one another.

Some UEs 120 may be considered machine-type communication (MTC) or evolved or enhanced machine-type communication (eMTC) UEs (or further enhanced eMTC (feMTC), or enhanced feMTC (efeMTC), or further evolutions thereof, all of which may be simply referred to as "MTC"). An MTC UE may be, may include, or may be included in or coupled with a robot, an unmanned aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless network 100).

Some UEs 120 may be classified according to different categories in association with different complexities and/or different capabilities. UEs 120 in a first category may facilitate massive IoT in the wireless network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, a UE 120 in the third category (a RedCap UE) may support lower latency communication than a UE 120 in the first category (an NB-IoT UE or an eMTC UE), and a UE 120 in the second category (a mission-critical IoT UE or a premium UE) may support lower latency communication than the UE 120 in the third category. Additionally or alternatively, in some examples, a UE 120 in the third category (a RedCap UE) may support higher wireless communication throughput than a UE 120 in the first category (an NB-IoT UE or an eMTC UE), and a UE 120 in the second category (a mission-critical IoT UE or a premium UE) may support higher wireless communication throughput than the UE 120 in the third category. Additionally or alternatively, in some examples, a UE 120 in the first category (an NB-IoT UE or an eMTC UE) may support longer battery life than a UE 120 in the third category (a RedCap UE), and the UE 120 in the third category may support longer battery life than a UE 120 in the second category (a mission-critical IoT UE or a premium UE).

In some examples, a UE 120 of the third category (a RedCap UE) may have capabilities that satisfy first device or performance requirements (such as parameters specified by Section 4.2.21 of 3GPP Technical Specification 38.306, Release 17) but not second device or performance requirements (such as parameters specified for NR UEs 120 other than UEs 120 of the third category, which may be defined by parameters specified by Section 4 of 3GPP Technical Specification 38.306, Release 17), while a UE 120 of the second category (a mission-critical IoT UE or a premium UE) may have capabilities that satisfy the second device or performance requirements (and also the first device or performance requirements, in some examples). For example, a UE 120 of the third category may support a lower maximum modulation and coding scheme (MCS) (for example, a modulation scheme such as quadrature phase shift keying (QPSK)) than an MCS supported by a UE 120 of the second category (for example, a modulation scheme such as 256-quadrature amplitude modulation (QAM)). As another example, a UE of the third category may support a lower maximum transmit power than a maximum transmit power of a UE of the second category. As another example, a UE 120 of the third category may have a less advanced beamforming capability than a beamforming capability of a UE 120 of the second category (for example, a RedCap UE may not be capable of forming as many beams as a premium UE). As another example, a UE 120 of the third category may require a longer processing time than a processing time of a UE 120 of the second category. As another example, a UE 120 of the third category may include less hardware or less complex hardware (such as fewer antennas, fewer transmit antennas, and/or fewer receive antennas) than a UE 120 of the second category. As another example, a UE 120 of the third category may not be capable of communicating on as wide of a maximum BWP as a UE 120 of the second category.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may communicate using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless network 100. In some other deployments and configurations, a UE 120 (instead of a network node 110) may perform, or collaborate or negotiate with one or more other UEs to perform, scheduling operations, resource selection operations, and/or other operations for sidelink communications.

Downlink and uplink resources may include time domain resources (frames, subframes, slots, and/or symbols), frequency domain resources (frequency bands, frequency carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a downlink control information (DCI) configuration to the one or more UEs 120) and/or reconfigured, which means that a BWP can be adjusted in real-time (or near-real-time) based on changing network conditions in the wireless network 100 and/or based on the specific requirements of the one or more UEs 120. This enables more efficient use of the available frequency domain resources in the wireless network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As indicated above, a BWP may be configured as a subset or a part of a total or full component carrier bandwidth and generally forms or encompasses a set of contiguous common resource blocks (CRBs) within the full component carrier bandwidth. In other words, within the carrier bandwidth, a BWP starts at a CRB and may span a set of consecutive CRBs. Each BWP may be associated with its own numerology (indicating a sub-carrier spacing (SCS) and cyclic prefix (CP)). A UE 120 may be configured with up to four downlink BWPs and up to four uplink BWPs for each serving cell. To enable reasonable UE battery consumption, only one BWP in the downlink and one BWP in the uplink are generally active at a given time on an active serving cell under typical operation. The active BWP defines the operating bandwidth of the UE 120 within the operating bandwidth of the serving cell while all other BWPs with which the UE 120 is configured are deactivated. On deactivated BWPs, the UE 120 does not transmit or receive any communications.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a UE 120 may implement power saving features, such as for UEs 120 in an RRC connected mode, an RRC idle mode, or an RRC inactive mode. Power saving features may include, for example, relaxed radio resource monitoring (such as for devices operating in low mobility or in good radio conditions), discontinuous reception (DRX), reduced PDCCH monitoring during active times, and/or power-efficient paging reception.

A UE 120 may operate in association with a DRX configuration (for example, indicated to the UE 120 by a network node 110). DRX operation may enable the UE 120 to enter a sleep mode at various times while in the coverage area of a network node 110 to reduce power consumption for conserving battery resources, among other examples. The DRX configuration generally configures the UE 120 to operate in association with a DRX cycle. The UE 120 may repeat DRX cycles with a configured periodicity according to the DRX configuration. A DRX cycle may include a DRX on duration during which the UE 120 is in an awake mode or in an active state, and one or more durations during which the UE 120 may operate in an inactive state, which may be opportunities for the UE 120 to enter a DRX sleep mode in which the UE 120 may refrain from monitoring for communications from a network node 110. Additionally or alternatively, the UE 120 may deactivate one or more antennas, RF chains, and/or other hardware components or devices while operating in the DRX sleep mode.

The time during which the UE 120 is configured to be in an active state during a DRX on duration may be referred to as an active time, and the time during which the UE 120 is configured to be in an inactive state, such as during a DRX sleep duration, may be referred to as an inactive time. During a DRX on duration, the UE 120 may monitor for downlink communications from one or more network nodes 110. If the UE 120 does not detect and/or does not successfully decode any downlink communications during the DRX on duration, the UE 120 may enter a DRX sleep mode for the inactive time duration at the end of the DRX on duration. Conversely, if the UE 120 detects and/or successfully decodes a downlink communication during the DRX on duration, the UE 120 may remain in the active state for the duration of a DRX inactivity timer (which may extend the active time). The UE 120 may start the DRX inactivity timer at a time at which the downlink communication is received. The UE 120 may remain in the active state until the DRX inactivity timer expires, at which time the UE 120 may transition to the sleep mode for an inactive time duration. Additionally or alternatively, the UE 120 may use a DRX cycle referred to as an extended DRX (eDRX) cycle, such as for use cases that are tolerant to latency. An eDRX cycle may include a relatively longer inactive time relative to a baseline DRX cycle (for example, an eDRX cycle may have a lower ratio of active time to inactive time).

The network nodes 110 and the UEs 120 of the wireless network 100 may communicate using the electromagnetic spectrum, which may be subdivided by frequency or wavelength into various classes, bands, carriers, and/or channels. For example, devices of the wireless network 100 may communicate using one or more operating bands. In some aspects, multiple wireless networks 100 may be deployed in a given geographic area. Each wireless network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHz through 24.25 GHz), FR4a or FR4-1 (52.6 GHz through 71 GHZ), FR4 (52.6 GHz through 114.25 GHZ), and FR5 (114.25 GHz through 300 GHz). Although a portion of FR1 is greater than 6 GHZ, FR1 is often referred to (interchangeably) as a "Sub-6 GHz" band in some documents and articles. Similarly, FR2 is often referred to (interchangeably) as a "millimeter wave" band in some documents and articles, despite being different from the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHZ. For example, each of FR4a, FR4-1. FR4, and FR5 falls within the EHF band. In some examples, the wireless network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

In some aspects, the UE 120 may include a communication manager 140. As described in more detail elsewhere herein, the communication manager 140 may receive, from a network node, configuration information indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals; transmit, to the network node, a first CSI report indicating first CSI associated with the downlink time intervals in accordance with the configuration information; and transmit, to the network node, a second CSI report indicating second CSI associated with the full-duplex time intervals in accordance with the configuration information. Additionally or alternatively, the communication manager 140 may perform one or more other operations described herein.

In some aspects, the network node 110 may include a communication manager 150. As described in more detail elsewhere herein, the communication manager 150 may transmit configuration information, associated with a UE, indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals; receive a first CSI report, associated with the UE, indicating first CSI associated with the downlink time intervals in accordance with the configuration information; and receive a second CSI report, associated with the UE, indicating second CSI associated with the full-duplex time intervals in accordance with the configuration information. Additionally or alternatively, the communication manager 150 may perform one or more other operations described herein.

Figure 2:
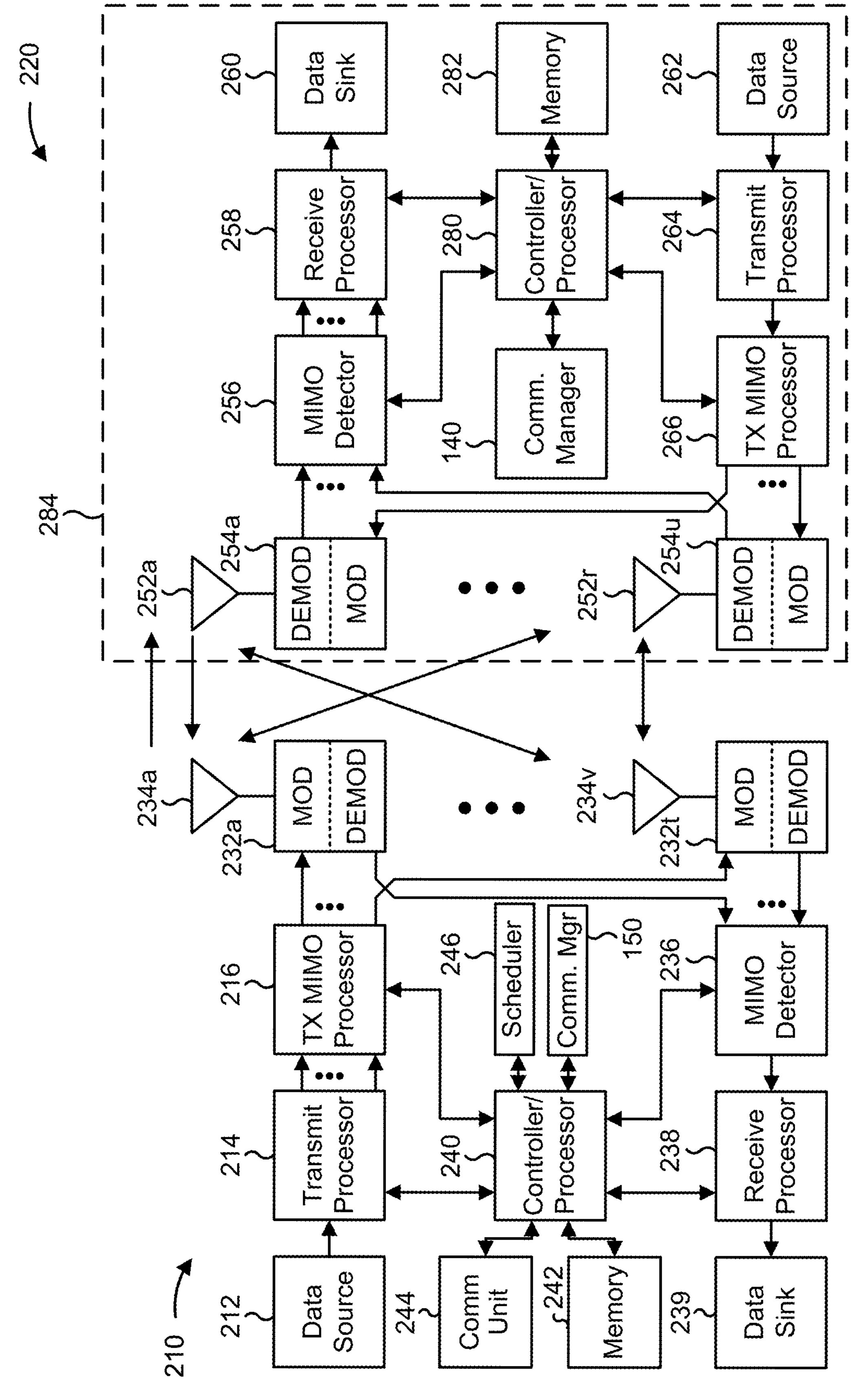
FIG. 2 is a diagram illustrating an example network node in communication with an example user equipment (UE) in a wireless network in accordance with the present disclosure.

FIG. 2 is a diagram illustrating an example network node 210 in communication with an example UE 220 in a wireless network in accordance with the present disclosure. The network node 210 of FIG. 2 may be an example of the network node 110 described with reference to FIG. 1. Similarly, the UE 220 may be an example of the UE 120 described with reference to FIG. 1.

As shown in FIG. 2, the network node 210 may include a data source 212, a transmit processor 214, a transmit (TX) multiple-input multiple-output (MIMO) processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150 among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 210. The transceiver may be under control of and used by a processor, such as the controller/processor 240, and in some aspects in conjunction with processor-readable code stored in the memory 242, to perform aspects of the methods, processes, and/or operations described herein. In some aspects, the network node 210 may include one or more interfaces, communication components, and/or other components that facilitate communication with the UE 220 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 210 may include transmit processor 214, TX MIMO processor 216, MIMO detector 236, receive processor 238, and/or controller/processor 240. Similarly, one or more processors of the UE 220 may include MIMO detector 256, receive processor 258, transmit processor 264, TX MIMO processor 266, and/or controller/processor 280. As used herein, "processor," "controller," or "controller/processor" can refer to a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof. A general purpose processor may be a microprocessor or any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

In some aspects, a single processor may perform all of the operations described as being performed by the one or more processors. In some aspects, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

For downlink communication from the network node 210 to the UE 220, the transmit processor 214 may receive data ("downlink data") intended for the UE 220 (or a set of UEs that includes the UE 220) from the data source 212 (such as a data pipeline or a data queue). In some examples, the transmit processor 214 may select one or more MCSs for the UE 220 in accordance with one or more channel quality indicators (CQIs) received from the UE 220. The network node 210 may process the data (for example, including encoding the data) for transmission to the UE 220 on a downlink in accordance with the MCS(s) selected for the UE 220 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 220 to the network node 210, uplink signals from the UE 220 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 210 may use the scheduler 246 to schedule one or more UEs 220 for downlink or uplink communications. In some aspects, the scheduler 246 may use DCI to dynamically schedule DL transmissions to the UE 220 and/or UL transmissions from the UE 220. In some examples, the scheduler 246 may allocate recurring time domain resources and/or frequency domain resources that the UE 220 may use to transmit and/or receive communications using an RRC configuration (for example, a semi-static configuration), for example, to perform semi-persistent scheduling (SPS) or to configure a configured grant (CG) for the UE 220.

One or more of the transmit processor 214, the TX MIMO processor 216, the modem 232, the antenna 234, the MIMO detector 236, the receive processor 238, and/or the controller/processor 240 may be included in an RF chain of the network node 210. An RF chain may include filters, mixers, oscillators, amplifiers, analog-to-digital converters (ADCs), and/or other devices that convert between an analog signal (such as for transmission or reception via an air interface) and a digital signal (such as for processing by one or more processors of the network node 210). In some aspects, the RF chain may be or may be included in a transceiver of the network node 210.

In some examples, the network node 210 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 210 may use the communication unit 244 to transmit and/or receive data associated with the UE 220 or to perform network control signaling, among other examples. The communication unit 244 may include a transceiver and/or an interface, such as a network interface.

The UE 220 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 220 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 220. The transceiver may be under control of and used by a processor, such as the controller/processor 280, and in some aspects in conjunction with processor-readable code stored in the memory 282, to perform aspects of the methods, processes, or operations described herein. In some aspects, the UE 220 may include another interface, another communication component, and/or another component that facilitates communication with the network node 210 and/or another UE 220.

For downlink communication from the network node 210 to the UE 220, the set of antennas 252 may receive the downlink communications or signals from the network node 210 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 220 to the data sink 260 (such as a data pipeline, a data queue, and/or an application executed on the UE 220), and may provide decoded control information and system information to the controller/processor 280.

For uplink communication from the UE 220 to the network node 210, the transmit processor 264 may receive and process data ("uplink data") from a data source 262 (such as a data pipeline, a data queue, and/or an application executed on the UE 220) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 210 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 220 by the network node 210.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, R output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*r* may transmit a set of uplink signals (for example, R uplink signals) via the corresponding set of antennas 252. An uplink signal may include an uplink control information (UCI) communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 220) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term “beam” may refer to a directional transmission of a wireless signal toward a receiving device or otherwise in a desired direction. “Beam” may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 220 or network nodes 110 may include different numbers of antenna elements. For example, a UE 220 may include a single antenna element, two antenna elements, four antenna elements, eight antenna elements, or a different number of antenna elements. As another example, a network node 210 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

The network node 210 may provide the UE 220 with a configuration of transmission configuration indicator (TCI) states that indicate or correspond to beams that may be used by the UE 220, such as for receiving one or more communications via a physical channel. For example, the network node 210 may indicate (for example, using DCI) an activated TCI state to the UE 220, which the UE 220 may use to generate a beam for receiving one or more communications via the physical channel. A beam indication may be, or may include, a TCI state information element, a beam identifier (ID), spatial relation information, a TCI state ID, a closed loop index, a panel ID, a TRP ID, and/or a sounding reference signal (SRS) set ID, among other examples. A TCI state information element (sometimes referred to as a TCI state herein) may indicate particular information associated with a beam. For example, the TCI state information element may indicate a TCI state identification (for example, a tri-StateID), a quasi-co-location (QCL) type (for example, a qcl-Type1, qcl-Type2, qcl-TypeA, qcl-TypeB, qcl-TypeC, or a qcl-TypeD, among other examples), a cell identification (for example, a ServCellIndex), a bandwidth part identification (bwp-Id), or a reference signal identification, such as a CSI-RS identification (for example, an NZP-CSI-RS-ResourceId or an SSB-Index, among other examples). Spatial relation information may similarly indicate information associated with an uplink beam. The beam indication may be a joint or separate DL/UL beam indication in a unified TCI framework. In a unified TCI framework, the network may support common TCI state ID update and activation, which may provide common QCL and/or common UL transmission spatial filters across a set of configured component carriers. This type of beam indication may apply to intra-band CA, as well as to joint DL/UL and separate DL/UL beam indications. The common TCI state ID may imply that one reference signal determined according to the TCI state(s) indicated by a common TCI state ID is used to provide QCL Type-D indication and to determine UL transmission spatial filters across the set of configured CCs.

In some examples, the network may support a layer 1 (L1)-based beam indication using at least UE-specific (unicast) DCI to indicate joint or separate DL/UL beam indications that may be selected from active TCI states. In some examples, DCI formats 1_1 and/or 1_2 may be used for beam indication. The network node 210 may include a support mechanism for the UE 220 to acknowledge successful decoding of a beam indication. For example, the acknowledgment/negative acknowledgment of the PDSCH scheduled by the DCI carrying the beam indication may also be used as an acknowledgement for the DCI.

Further efficiencies in throughput, signal strength, and/or other signal properties may be achieved through beam refinement. For example, the network node 210 may be capable of communicating with the UE 220 using beams of various beam widths. For example, the network node 210 may be configured to utilize a wider beam to communicate with the UE 220 when the UE 220 is in motion because wider coverage may increase the likelihood that the UE 220 remains in coverage of the network node 210 while moving. Conversely, the network node 210 may use a narrower beam to communicate with the UE 220 when the UE 220 is stationary because the network node 210 can reliably focus coverage on the UE 220 with low or minimal likelihood of the UE 220 moving out of the coverage area of the network node 210. In some examples, to select a particular beam for communication with a UE 220, the network node 210 may transmit a reference signal, such as an SSB or a CSI-RS, on each of a plurality of beams in a beam-sweeping manner. In some examples, SSBs may be transmitted on wider beams, whereas CSI-RSs may be transmitted on narrower beams. The UE 220 may measure the RSRP or the signal-to-interference-plus-noise ratio (SINR) on each of the beams and transmit a beam measurement report (for example, an L1 measurement report) to the network node 210 indicating the RSRP or SINR associated with each of one or more of the measured beams. The network node 210 may then select the particular beam for communication with the UE 220 based on the L1 measurement report. In some other examples, when there is channel reciprocity between the uplink and the downlink, the network node 210 may derive the particular beam to communicate with the UE 220 (for example, on both the uplink and downlink) based on uplink measurements of one or more uplink reference signals, such as an SRS, transmitted by the UE 220.

One enhancement for multi-beam operation at higher carrier frequencies is facilitation of efficient (for example, low latency and low overhead) downlink and/or uplink beam management operations to support higher Layer 1 and/or Layer 2 (L1/L2)-centric inter-cell mobility. L1 and/or L2 signaling may be referred to as “lower layer” signaling and may be used to activate and/or deactivate candidate cells in a set of cells configured for L1/L2 mobility and/or to provide reference signals for measurement by the UE 220, by which the UE 220 may select a candidate beam as a target beam for a lower layer handover operation. Accordingly, one goal for L1/L2-centric inter-cell mobility is to enable a UE to perform a cell switch via dynamic control signaling at lower layers (for example, DCI for L1 signaling or a medium access control (MAC) control element (MAC-CE) for L2 signaling), rather than semi-static Layer 3 (L3) RRC signaling, in order to reduce latency, reduce overhead, and/or otherwise increase efficiency of the cell switch.

In some examples, for a UE 220, UL transmission may be performed using one antenna panel, and DL reception may be performed using another antenna panel. In some examples, full-duplex communication may be conditional on a beam separation of the UL beam and DL beam at respective antenna panels. Utilizing full-duplex communication may provide a reduction in latency, such that it may be possible to receive a DL signal in UL-only slots, which may enable latency savings. In addition, full-duplex communication may enhance spectrum efficiency per cell or per UE 220, and may enable more efficient utilization of resources. Beam separation of the UL and DL beams assists in limiting or reducing self-interference that may occur during full-duplex communication. UL and DL beams that are separated on their respective antenna panels may provide reliable full-duplex communication by minimizing or reducing self-interference.

A full-duplex UE 220 may perform a self-interference measurement (SIM) procedure to identify self-interference from transmissions of the full-duplex UE 220. A full-duplex network node 210 also may perform a SIM procedure to identify self-interference from transmissions of the full-duplex network node 210. The UE 220 may provide a measurement report to the network node 210 to indicate results of the UE SIM. The network node 210 may select pairs of beams (referred to herein as "beam pairs") for the UE 220 ("UE beam pairs") and the network node 210 ("network node beam pairs") to use during full-duplex communications. A beam pair generally includes a receive (Rx) beam and a transmit (Tx) beam, such as a DL beam and an UL beam, respectively, for the UE 220, and similarly, an UL beam and a DL beam, respectively, for the network node 210.

Figure 3:
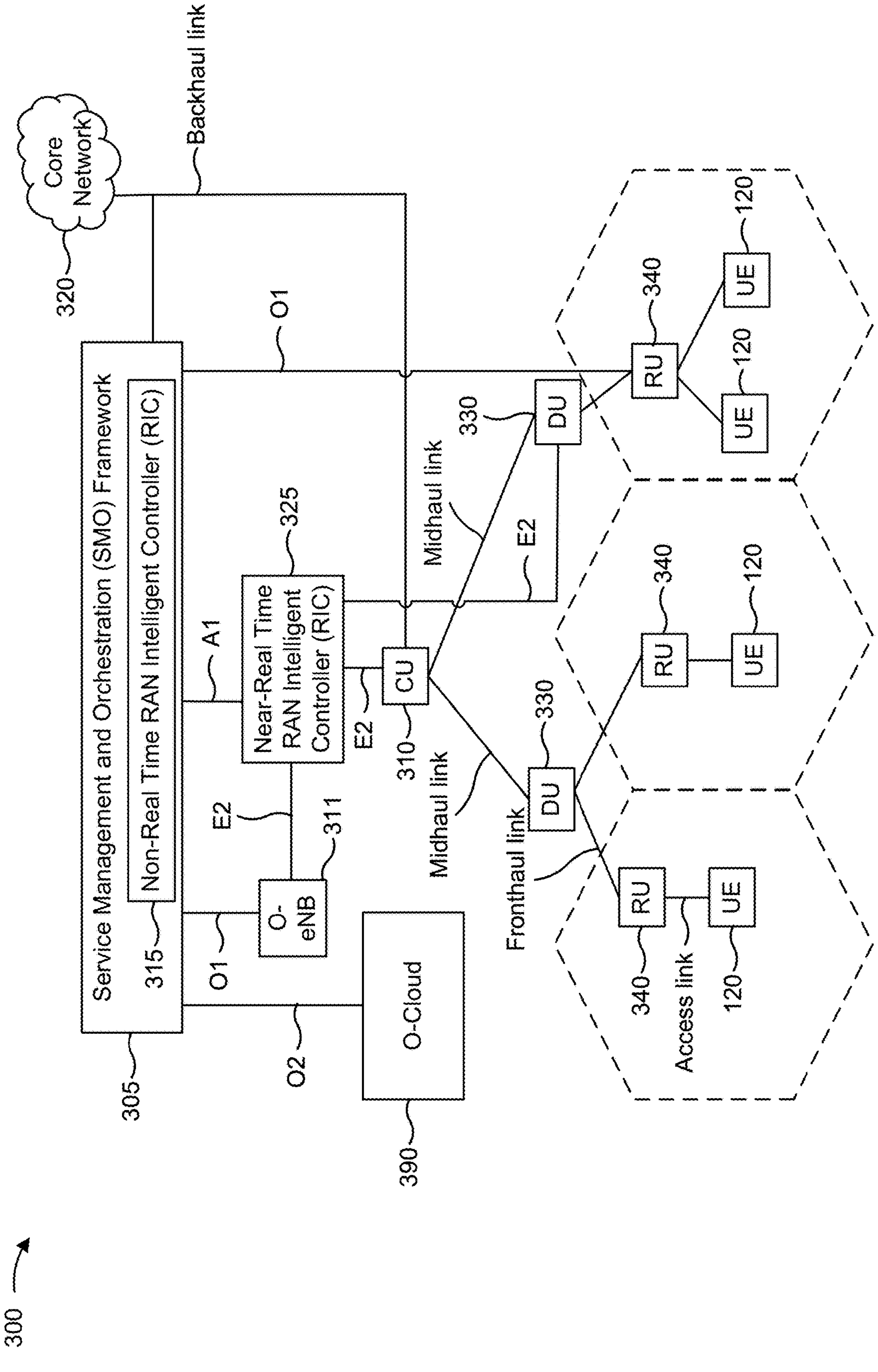
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110 or one or more network nodes 210). The disaggregated base station architecture 300 may include a CU 310 that can communicate directly with a core network 320 via a backhaul link, or that can communicate indirectly with the core network 320 via one or more disaggregated control units, such as a Near-RT RIC 325 (for example, via an E2 link) and/or a Non-RT RIC 315 associated with a Service Management and Orchestration (SMO) Framework 305. The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 325, the Non-RT RICs 315, and the SMO Framework 305, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 305 may support RAN deployment and provisioning of non-virtualized and virtualized network elements. For non-virtualized network elements, the SMO Framework 305 may support the deployment of dedicated physical resources for RAN coverage requirements, which may be managed via an operations and maintenance interface, such as an O1 interface. For virtualized network elements, the SMO Framework 305 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 315, and/or a Near-RT RIC 325. In some aspects, the SMO Framework 305 may communicate with a hardware aspect of a 4G RAN, a 5G NR RAN, and/or a 6G RAN, such as an open eNB (O-eNB) 311, via an O1 interface. Additionally or alternatively, the SMO Framework 305 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 315 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 325. The Non-RT RIC 315 may be coupled to or may communicate with (such as via an A1 interface) the Near-RT RIC 325. The Near-RT RIC 325 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 325.

In some aspects, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may tune RAN behavior or performance. For example, the Non-RT RIC 315 may monitor long-term trends and patterns for performance and may employ AI/ML models to perform corrective actions via the SMO Framework 305 (such as reconfiguration via an O1 interface) or via creation of RAN management policies (such as A1 interface policies).

The network node 110, the controller/processor 240 of the network node 210, the UE 120, the controller/processor 280 of the UE 220, the CU 310, the DU 330, the RU 340, or any other component(s) of FIG. 1, 2, or 3 may implement one or more techniques or perform one or more operations associated with a CSI framework for full-duplex operations, as described in more detail elsewhere herein. For example, the controller/processor 240 of the network node 210, the controller/processor 280 of the UE 220, any other component(s) of FIG. 2, the CU 310, the DU 330, or the RU 340 may perform or direct operations of, for example, process 1200 of FIG. 12, process 1300 of FIG. 13, or other processes as described herein (alone or in conjunction with one or more other processors). The memory 242 may store data and program codes for the network node 110, the network node 210, the CU 310, the DU 330, or the RU 340. The memory 282 may store data and program codes for the UE 120 or the UE 220. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 210, the UE 220, the CU 310, the DU 330, or the RU 340, may cause the one or more processors to perform or direct operations of, for example, process 1200 of FIG. 12, process 1300 of FIG. 13, or other processes as described herein. In some examples, executing instructions may include running the instructions, converting the instructions, compiling the instructions, or interpreting the instructions, among other examples.

In some aspects, a UE (e.g., the UE 120 or the UE 220) includes means for receiving, from a network node, configuration information indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals; means for transmitting, to the network node, a first CSI report indicating first CSI associated with the downlink time intervals in accordance with the configuration information; and/or means for transmitting, to the network node, a second CSI report indicating second CSI associated with the full-duplex time intervals in accordance with the configuration information. The means for the UE 220 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110 or the network node 210) includes means for transmitting configuration information, associated with a UE, indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals; means for receiving a first CSI report, associated with the UE, indicating first CSI associated with the downlink time intervals in accordance with the configuration information; and/or means for receiving a second CSI report, associated with the UE, indicating second CSI associated with the full-duplex time intervals in accordance with the configuration information. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, communication unit 244, or scheduler 246.

Figure 4:
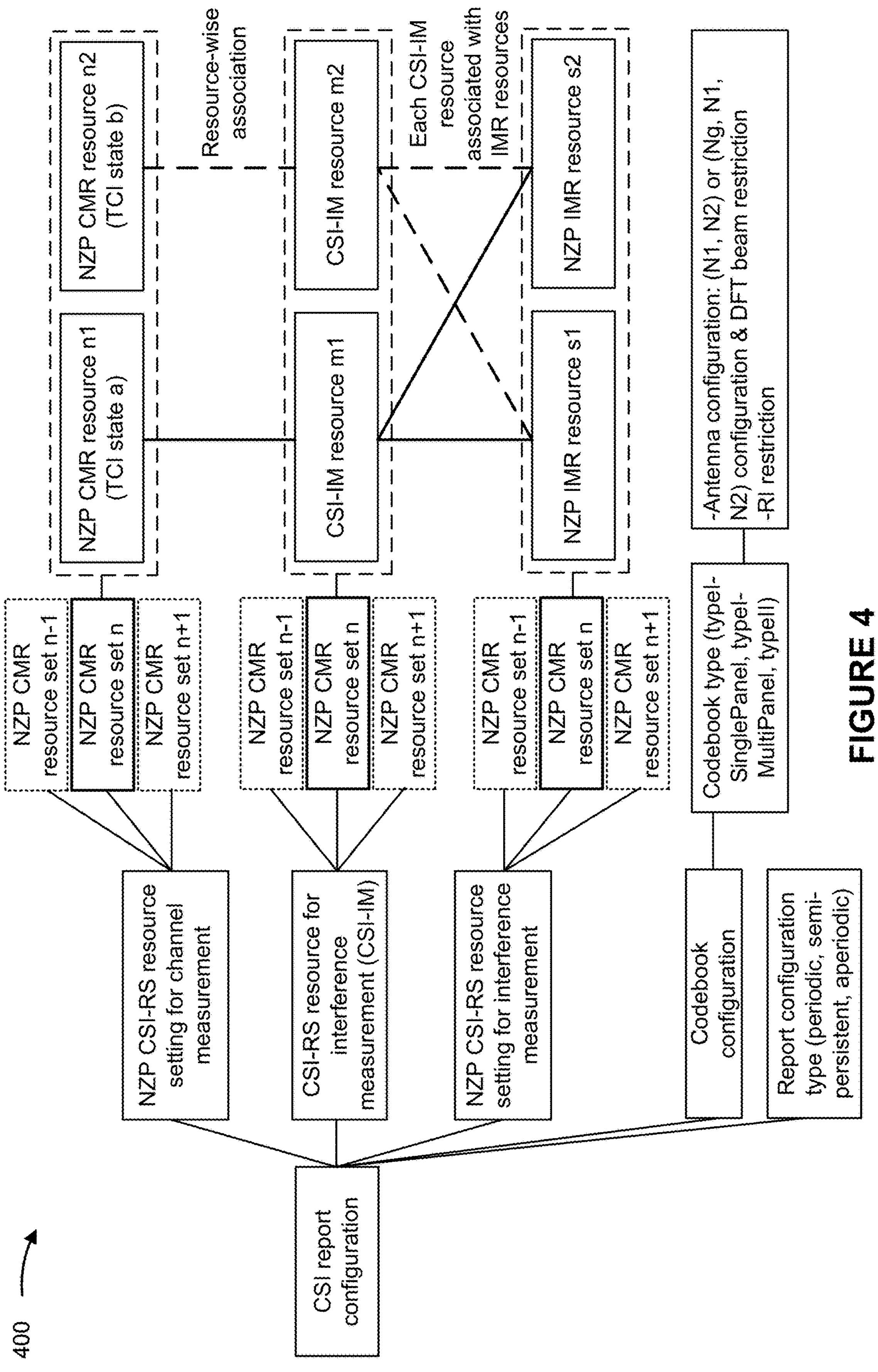
FIG. 4 is a diagram illustrating an example of a channel state information (CSI) report configuration in accordance with the present disclosure.

FIG. 4 is a diagram illustrating an example of a CSI report configuration 400 in accordance with the present disclosure. The CSI report configuration 400 may be configured per bandwidth part (BWP). A resource set may have Ks resources with the same quantity of CSI-RS ports. If Ks=1, each resource may contain 32 CSI-RS ports (for example, if a network node 110 associated with the CSI report configuration includes 32 antenna ports). If Ks=2, each resource may contain at most 16 CSI-RS ports. For Ks=2 to 8, each resource may contain up to 8 CSI-RS ports. A P-port resource has ports labeled from 3000 to 3000(P−1).

The CSI report configuration 400 may include a CSI resource setting for a channel measurement resource (CMR), a CSI resource setting for CMR and CSI interference measurement (CSI-IM) or non-zero power (NZP) interference measurement resource (IMR), and a CSI resource setting for CMR and CSI-IM and NZP-IMR. A CMR may be associated with estimating channel conditions. For example, a UE may measure a CMR to estimate the channel conditions (for example, the UE may measure a CMR to perform a channel measurement, such as an RSRP measurement). An IMR or a CSI-IM resource may be associated with estimating interference associated with a channel. For example, a UE may measure an IMR or a CSI-IM resource to estimate the interference (for example, the UE may measure an IMR to perform an interference measurement). Each resource setting may have one active resource set, and each resource set may have one or more resources (N resources). A UE may evaluate CSI associated with the N NZP CMR resources and select 1 (one) CMR resource out of N resources. The UE may report a CSI-RS resource indicator (CRI) as part of CSI feedback. The network node may determine a reported CSI that is associated with an NZP CMR resource. The CSI report configuration may also be referred to as a "CSI report setting."

The CSI report configuration may include a codebook configuration that includes a codebook type, such as Type I single panel, Type I multi-panel, Type II single panel, Type II port selection, or Type II enhanced port selection. A codebook type may have an antenna configuration of Ng panels with dimensions N1 and N2. The codebook type may be associated with a DFT beam restriction. The codebook type may have a rank indicator (RI) restriction, or a limit on the quantity of layers. The CSI report configuration may be of a report configuration type (for example, periodic, semi-persistent, aperiodic).

A UE may use the same set of CSI-RS resources for CSI measurements for different adaptation configurations. In some aspects, the UE may derive CSI for reduced antenna port configurations from a CSI-RS resource with a higher quantity of reports. The UE may transmit supplemental CSI (S-CSI) that is associated with reduced antenna configurations. S-CSI may be derived from the resources configured for the base antenna configuration. The UE may be configured with restriction rules on CSI-RS resources and a codebook for the reduced antenna configuration.

In an example, a CSI report configuration 0 (zero) may include a resource setting and a codebook configuration. A full antenna configuration may include a 32-port CSI-RS resource and a codebook configuration where N1=4 and N2=4. A CSI measurement and report for a reduced antenna configuration may include, for example, a 4-port CSI-RS with N1=2 and N2=1, an 8-port CSI-RS with N1=2 and N2=2, an 8-port CSI-RS with N1=4 and N2=1, or a 16-port CSI-RS with N1=4 and N2=2.

There may be two signaling approaches. One option may include separate CSI report configurations, where a CSI report configuration includes a full antenna configuration and a new supplemental configuration for reduced antenna configuration. Another option may involve using the same CSI report configuration, where a CSI report configuration is extended by adding a new information element (IE) with supplemental configuration information for a reduced (or different) antenna configuration.

Figure 5:
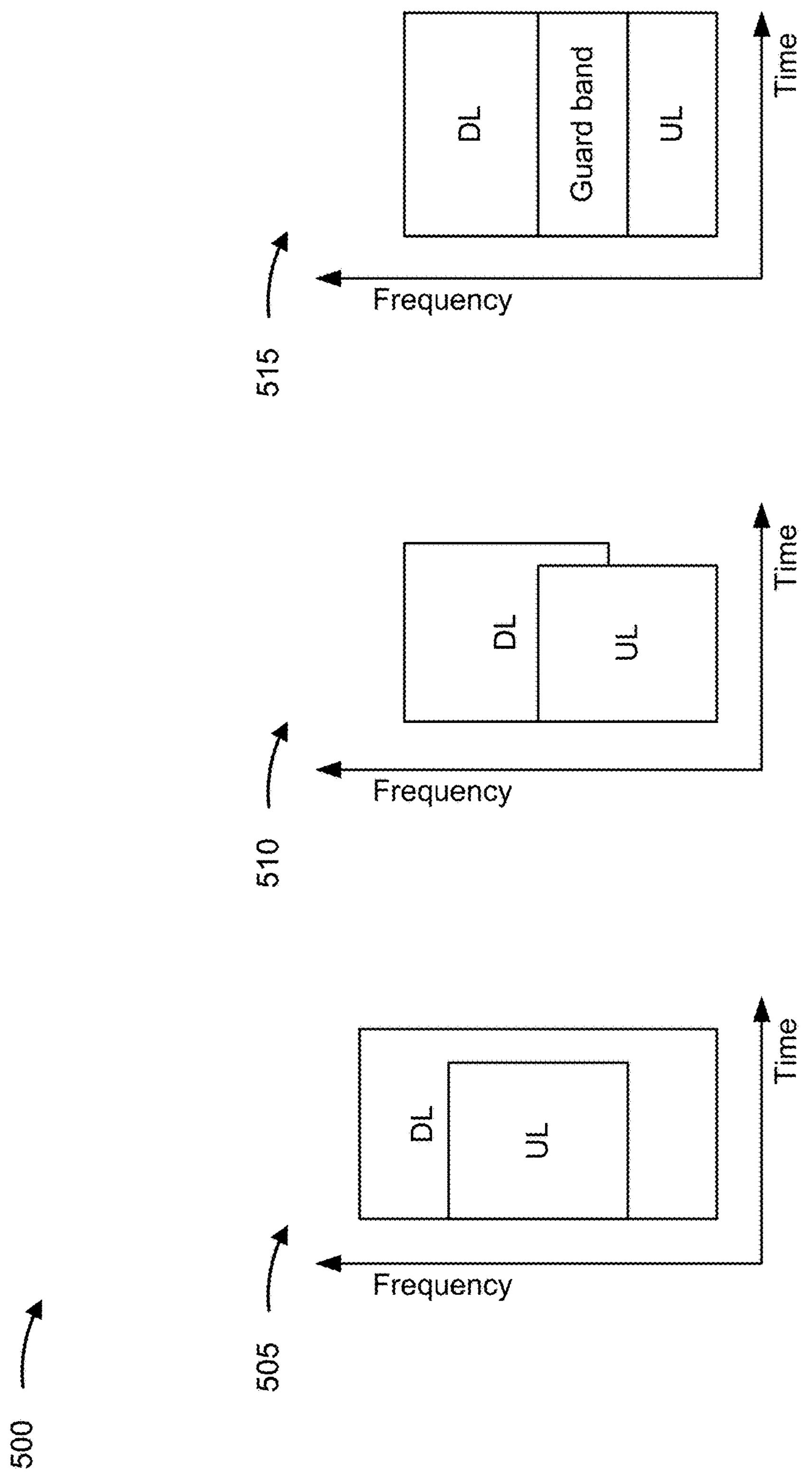
FIG. 5 is a diagram illustrating examples of full-duplex communication in a wireless network in accordance with the present disclosure.

FIG. 5 is a diagram illustrating examples of full-duplex communication 500 in a wireless network in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (for example, in the same slot or the same symbol). "Half-duplex communication" or "non-full-duplex communication" in a wireless network refers to unidirectional communications (for example, only downlink communication or only uplink communication) between devices at a given time (for example, in a given slot or a given symbol). For example, for full-duplex communications, a downlink bandwidth part (BWP) and an uplink BWP may be active at the same time (for example, using the same, or at least partially overlapping, time domain resources).

FIG. 5 depicts examples of in-band full-duplex (IBFD) communication. In IBFD, a UE may transmit an uplink communication to a network node and receive a downlink communication from the network node on the same time and frequency resources. In IBFD, a network node may transmit a downlink communication and receive an uplink communication on the same time and frequency resources. For example, as indicated by IBFD 505, the time and frequency resources for uplink communication may fully overlap with the time and frequency resources for downlink communication. As another example, as indicated by IBFD 510, the time and frequency resources for uplink communication may partially overlap with the time and frequency resources for downlink communication.

FIG. 5 also depicts an example of sub-band full-duplex (SBFD) communication, which may also be referred to as "sub-band frequency division duplex (SBFDD)" or "flexible duplex." In SBFD, a UE may transmit an uplink communication to a network node and receive a downlink communication from the network node at the same time, but on different frequency resources. In SBFD 515, a network node may transmit a downlink communication and receive an uplink communication at the same time, but on different frequency resources. For example, the different frequency resources may be sub-bands of a frequency band, such as a time division duplexing band. In such examples, the frequency resources used for downlink communication may be separated from the frequency resources used for uplink communication, in the frequency domain, by a guard band.

As used herein, "full-duplex time interval" may refer to a time interval configured for full-duplex operation (for example, at the UE and/or a network node). For example, as used herein, "time interval" may refer to a transmission time interval (TTI), a slot, a symbol (for example, an OFDM symbol), multiple symbols (for example, a group or set of symbols), a mini-slot, and/or another time interval. A full-duplex time interval may be an IBFD time interval (for example, in which IBFD operations are performed by the UE and/or network node) or an SBFD time interval (for example, in which SBFD operations are performed by the UE and/or network node). In some examples, a slot configuration may include a combination of downlink slots, uplink slots, or full-duplex slots (for example, an SBFD slot or an in-band full-duplex slot). A full-duplex slot may include one or more downlink time/frequency resources and one or more uplink time/frequency resources. A downlink time/frequency resource in the full-duplex slot may be separated (for example, in time or frequency) from an uplink time/frequency resource in the full-duplex slot by a gap, which may function to reduce self-interference and improve latency and uplink coverage. For example, the gap may be a frequency offset or a frequency gap between downlink time/frequency resources and uplink time/frequency resources in the same full-duplex slot. For example, a network node may be operating in a full-duplex mode (for example, transmitting and receiving at the same time on the same or different frequency domain resources). The network node may schedule a first UE to receive a downlink communication in a full-duplex slot. The network node may schedule a second UE to transmit an uplink communication in the same full-duplex slot.

Figure 6:
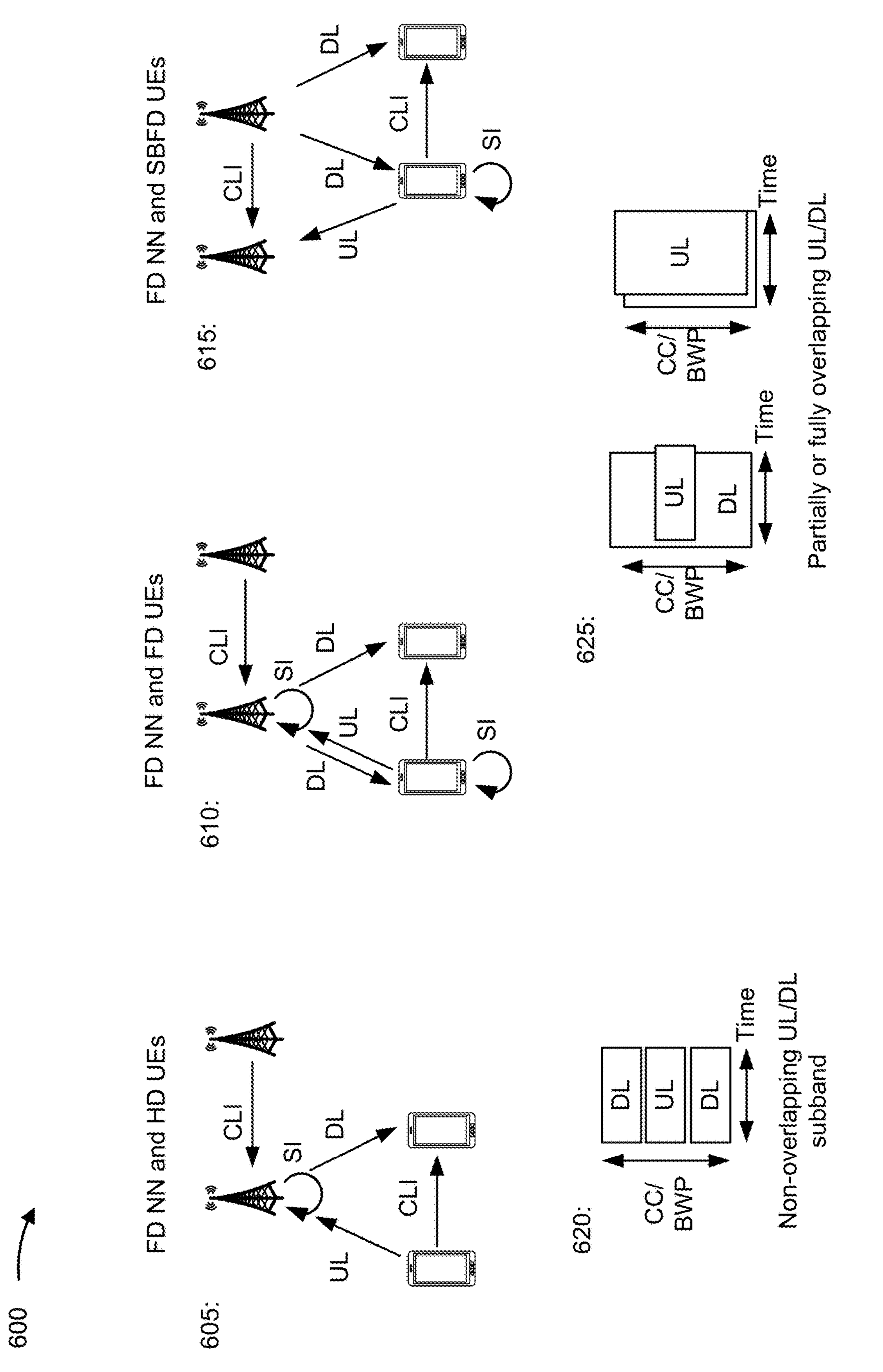
FIG. 6 is a diagram illustrating examples of full-duplex communications in accordance with the present disclosure.

FIG. 6 is a diagram illustrating examples 600 of full-duplex communications in accordance with the present disclosure. In a first operation 605, a full-duplex network node (NN) may communicate with half-duplex UEs (for example, UEs operating in a half-duplex mode). The full-duplex network node may be subjected to CLI from another full-duplex network node (for example, inter-network node CLI). The full-duplex network node may experience self-interference (SI). The full-duplex network node may receive an uplink transmission from a first half-duplex UE, and the full-duplex network node may transmit a downlink transmission to a second half-duplex UE. The second half-duplex UE may be subjected to CLI from the first half-duplex UE (for example, inter-UE CLI), where the CLI may be based at least in part on the uplink transmission from the first half-duplex UE.

In a second operation 610, a full-duplex network node may communicate with full-duplex UEs. The full-duplex network node may be subjected to CLI from another full-duplex network node. The full-duplex network node may experience SI. The full-duplex network node may transmit a downlink transmission to a first full-duplex UE, and the full-duplex network node may receive an uplink transmission from the first full-duplex UE at the same time as the downlink transmission. The full-duplex network node may transmit a downlink transmission to a second full-duplex UE. The second full-duplex UE may be subjected to CLI from the first full-duplex UE, where the CLI may be based at least in part on the uplink transmission from the first full-duplex UE. The first UE may experience SI.

In a third operation 615, a first full-duplex network node, which may be associated with multiple TRPs, may communicate with SBFD UEs. The first full-duplex network node may be subjected to CLI from a second full-duplex network node. The first full-duplex network node may receive an uplink transmission from a first SBFD UE. The second full-duplex network node may transmit downlink transmissions to both the first SBFD UE and a second SBFD UE. The second SBFD UE may be subjected to CLI from the first SBFD UE, where the CLI may be based at least in part on the uplink transmission from the first SBFD UE. The first SBFD UE may experience SI.

In slot configuration 620, an SBFD slot may be associated with a non-overlapping uplink/downlink sub-bands. Within a component carrier bandwidth and/or a BWP, an uplink resource may be in between, in a frequency domain, a first downlink resource and a second downlink resource. The first downlink resource, the second downlink resource, and the uplink resource may all be associated with the same time domain resources.

In a slot configuration 625, a slot (for example, a full-duplex slot) may be associated with partially or fully overlapping uplink/downlink resources. Within a component carrier bandwidth and/or a BWP, an uplink resource may fully or partially overlap with a downlink resource.

In addition to full-duplex operations, CLI may be introduced due to time division duplexing (TDD) configurations for neighboring cells. For example, in dynamic TDD, the allocation of network resources to uplink and downlink may be dynamically modified depending on a traffic load. For example, a network node (NN) 110 may configure a TDD configuration (for example, a TDD pattern) with more uplink transmission time intervals (TTIs) (for example, frames, subframes, slots, mini-slots, and/or symbols) for a UE when the UE has uplink data to transmit, and may configure a TDD configuration with more downlink TTIs for the UE when the UE has downlink data to receive. The TDD configuration may be dynamically configured to modify an allocation of uplink TTIs and downlink TTIs used for communication between the network node and the UE. When neighboring network nodes use different TDD configurations to communicate with UEs, this may result in a downlink communication between a first network node and a first UE in a same TTI as an uplink communication between a second network node and a second UE. These communications in different transmission directions (for example, downlink vs. uplink) in the same TTI may interfere with one another, which may be referred to as CLI.

For example, the second UE may transmit, and the first UE may receive, an uplink communication (for example, where the uplink communication is intended for a network node and not the first UE). The reception of the uplink communication by the first UE may cause interference (for example, CLI), at the first UE, with a downlink communication from a network node (for example, the uplink communication may interfere with a downlink communication that the first UE is attempting to receive). This CLI may be referred to as uplink-to-downlink (UL-to-DL) interference or UE-to-UE interference, among other examples. This UE-to-UE interference may occur and/or may increase when the first UE and the second UE are in close proximity, and may be avoided or mitigated by preventing scheduling of the UEs in different transmission directions in the same TTI. In some examples, UE-to-UE interference may occur between UEs in the same cell (for example, communicating with the same network node, rather than different network nodes).

Figure 7:
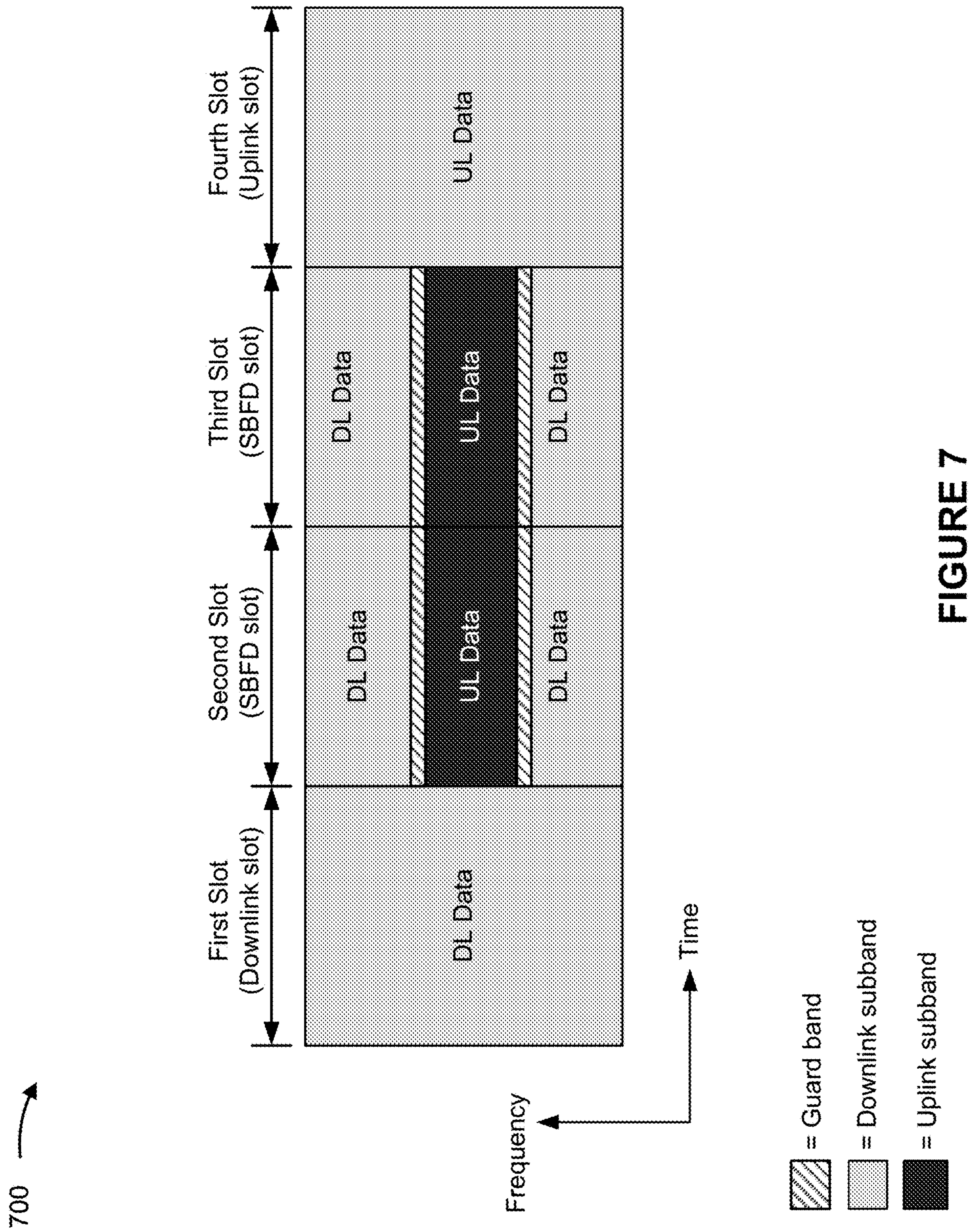
FIG. 7 is a diagram illustrating an example of a subband-full-duplex slot format in accordance with the present disclosure.

FIG. 7 is a diagram illustrating an example of an SBFD slot format 700 in accordance with the present disclosure. An SBFD slot format may be a slot format that is defined or configured as a "downlink and uplink" slot (for example, a "D+U" slot). The downlink and uplink slot may be a slot in which a band is used for both uplink and downlink transmissions. The downlink and uplink transmissions may occur in overlapping bands (for example, IBFD) or in adjacent bands (for example, SBFD). In a given symbol of the downlink and uplink slot (for example, the SBFD slot), a half-duplex UE may either transmit in an uplink band or receive in a downlink band. In a given symbol of the downlink and uplink slot, a full-duplex UE may transmit in an uplink band and/or receive in a downlink band (for example, in the same slot). The downlink and uplink slot may include downlink only symbols, uplink only symbols, or full-duplex symbols.

As shown in FIG. 7, a first slot may be associated with downlink data for a first UE. A second slot (for example, an SBFD slot) may be associated with downlink data for the first UE, uplink data for the first UE, and downlink data for a second UE. The uplink data may be associated with a physical uplink shared channel (PUSCH) transmission. A third slot (for example, an SBFD slot) may be associated with downlink data for the first UE, uplink data for the first UE, and downlink data for the second UE. A fourth slot may be associated with uplink data for the first UE.

Figure 8:
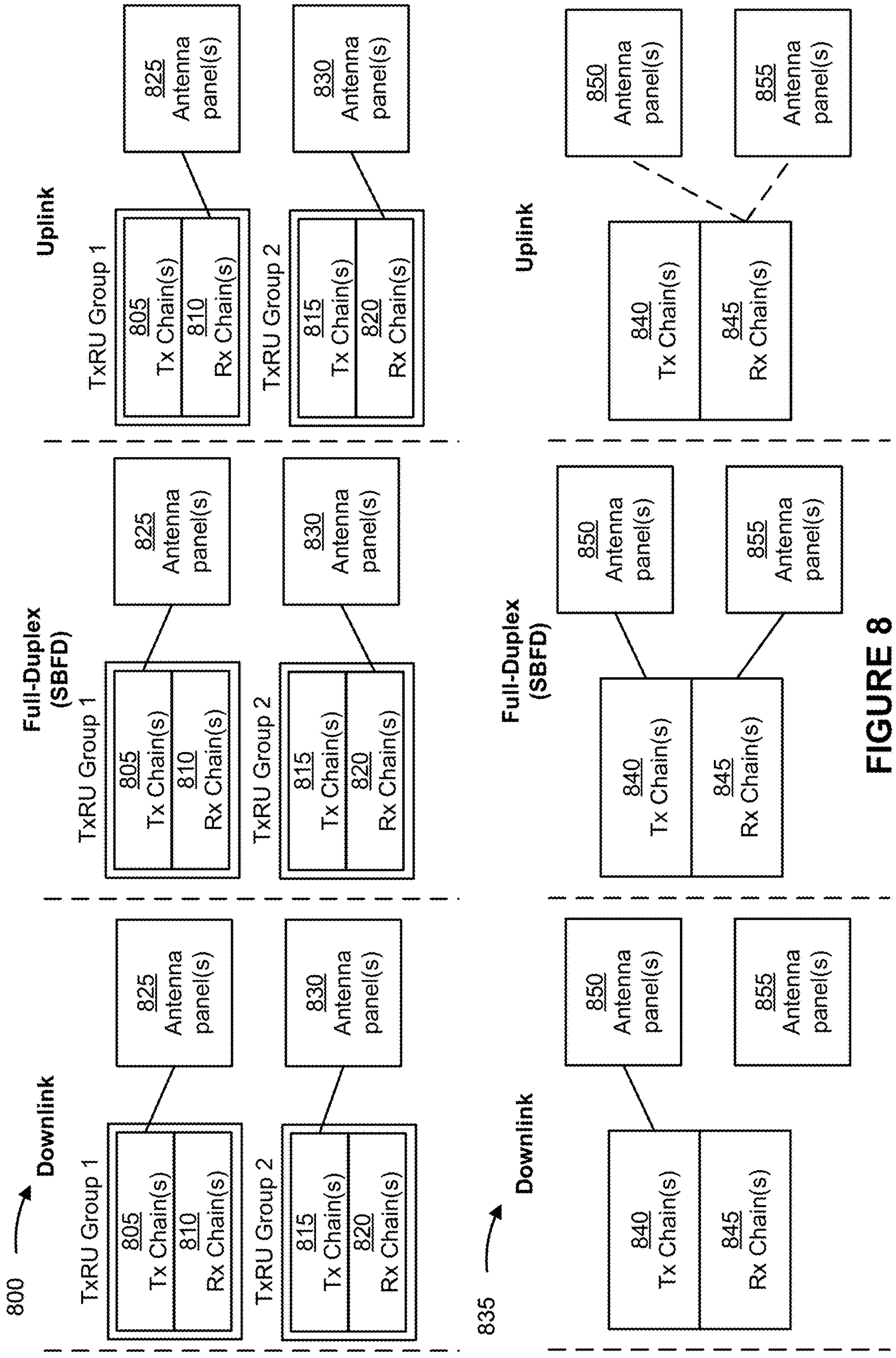
FIG. 8 is a diagram illustrating examples of network node antenna configurations for full-duplex and non-full-duplex communications in accordance with the present disclosure.

FIG. 8 is a diagram illustrating examples of network node antenna configurations for full-duplex and non-full-duplex communications in accordance with the present disclosure. For example, a network node (for example, a network node 110 or a network node 210) may use different antenna configurations (or different antenna implementations) for full-duplex communications (for example, SBFD communications) and non-full-duplex communications (for example, uplink communications and downlink communications).

A first antenna configuration 800 may be associated with a network node that includes a first transmitter radio unit (TxRU) group (TxRU group 1) and a second TxRU group (TxRU group 2). The first TxRU group and the second TxRU group may include one or more transceivers or one or more transceiver units. The first TxRU group may include one or more transmit (Tx) chains 805 and one or more receive (Rx) chains 810. Similarly, the second TxRU group may include one or more Tx chains 815 and one or more Rx chains 820.

A Tx chain may include one or more components of the network node, such as one or more components described in connection with FIG. 2. For example, a Tx chain may include a transmit processor, a TX MIMO processor, an encoder, a serial-to-parallel (S/P) converter, a mapper (for example, for mapping parallel data streams onto respective constellation points), an inverse fast Fourier transform (iFFT) component, a parallel-to-serial (P/S) converter, a guard insertion component, one or more RF front end components, a modem, and/or a controller/processor, among other examples. A Tx chain may be implemented in a network node for transmitting data (for example, downlink data, a downlink reference signal, and/or downlink control information) to another device, such as a UE. An Rx chain may include one or more components of the network node, such as one or more components described in connection with FIG. 2. For example, an Rx chain may include one or more RF front end components, a receive processor, a MIMO detector, a guard removal component, an S/P converter, a fast Fourier transform (FFT) component, a demapper, a P/S converter, a decoder, a modem, and/or a controller/processor, among other examples. An Rx chain may be implemented in a network node for receiving data (for example, uplink data, an uplink reference signal, and/or uplink control information).

As shown in FIG. 8, the network node may include one or more antenna panels 825 and one or more antenna panels 830. In some other examples, the network node may use a first one or more antenna elements and a second one or more antenna elements included in the same antenna panel in a similar manner as described herein (for example, rather than separate antenna panels). An antenna panel may include one or more antenna elements, as described in more detail elsewhere herein, such as in connection with FIG. 2.

In the first antenna configuration 800, and during downlink time intervals, the network node may use the one or more Tx chains 805 and the one or more Tx chains 815 to transmit signals (for example, downlink data, a downlink reference signal, and/or downlink control information). For example, the one or more Tx chains 805 may provide data to be transmitted via the one or more antenna panels 825. The one or more Tx chains 815 may provide data to be transmitted via the one or more antenna panels 830. In other words, during downlink time intervals (for example, downlink slots, downlink symbols, or other downlink time intervals), the network node may use both the one or more antenna panels 825 and the one or more antenna panels 830 to transmit downlink signals.

During full-duplex time intervals (for example, SBFD time intervals), the network node may use the one or more Tx chains 805 (for example, included in the first TxRU group) to transmit signals (for example, downlink data, a downlink reference signal, and/or downlink control information) via the one or more antenna panels 825. The network node may use the one or more Rx chains 820 (for example, included in the second TxRU group) to receive signals (for example, uplink data, an uplink reference signal, and/or uplink control information) via the one or more antenna panels 830. During uplink time intervals (for example, uplink slots, uplink symbols, and/or other uplink time intervals), the network node may use the one or more Rx chains 810 and the one or more Rx chains 820 to receive signals (for example, uplink data, an uplink reference signal, and/or uplink control information). For example, the one or more Rx chains 810 may obtain data that is received via the one or more antenna panels 825. The one or more Rx chains 820 may obtain data that is received via the one or more antenna panels 830. In other words, during uplink time intervals, the network node may use both the one or more antenna panels 825 and the one or more antenna panels 830 to receive signals.

As another example, in a second antenna configuration 835, the network node may include one or more Tx chains 840, one or more Rx chains 845, one or more antenna panels 850, and one or more antenna panels 855. During downlink time intervals, the network node may use one or more Tx chains 840 to transmit signals (for example, downlink data, a downlink reference signal, and/or downlink control information) via one or more antenna panels 850. During full-duplex time intervals (for example, SBFD time intervals), the network node may use the one or more Tx chains 840 to transmit signals via the one or more antenna panels 850 and may use the one or more Rx chains 845 to receive signals via the one or more antenna panels 855. During uplink time intervals, the network node may use the one or more Rx chains 845 to receive signals (for example, via either the one or more antenna panels 850 or the one or more antenna panels 855).

The first antenna configuration 800 may be associated with efficient antenna usage of the network node. For example, as shown in FIG. 8, during each time interval, the network node may use both the one or more antenna panels 825 and the one or more antenna panels 830 to either transmit or receive signals. However, the antenna panels and/or antenna elements used by the network node to transmit signals may be different during downlink time intervals as compared to full-duplex time intervals. For example, during the downlink time intervals, the network node may use both the one or more antenna panels 825 and the one or more antenna panels 830 to transmit signals. During full-duplex time intervals, the network node may only use the one or more antenna panels 825 to transmit signals. As a result, a UE receiving downlink signals from the network node may be unable to apply measurements performed during a first type of time interval (for example, downlink time intervals or full-duplex time intervals) for estimating a channel or calculating CSI for a second type of time interval (for example, the other of downlink time intervals or full-duplex time intervals). In other words, because of the different antenna elements or antenna panels used by the network node, there may be a difference between a downlink channel during downlink time intervals and the downlink channel during full-duplex time intervals. In other examples, such as the second antenna configuration 835, the network node may use the same antennas and/or antenna elements for transmitting downlink signals during full-duplex time intervals and during downlink time intervals. For example, when using the second antenna configuration 835, the network node may use the one or more antenna panels 850 for transmitting downlink signals during both full-duplex time intervals and downlink time intervals. In such examples, a UE receiving downlink signals from the network node may apply measurements performed during a first type of time interval (for example, downlink time intervals or full-duplex time intervals) for estimating a channel or calculating CSI for a second type of time interval (for example, the other of downlink time intervals or full-duplex time intervals).

However, the UE may be unaware of the antenna configuration and/or the antenna implementation of the network node. For example, the UE may be aware of an antenna array size, but may not be aware of a Tx chain and/or Rx chain implementation of the network node. The UE may perform measurements (for example, CSI measurements) during a downlink time interval and apply the CSI measurements to calculate CSI for a full-duplex time interval. In some examples, such as when the network node uses different Tx chains, antenna panels, and/or antenna elements for downlink time intervals and full-duplex time intervals, this may result in an inaccurate CSI calculation. Using inaccurate CSI may degrade the performance of communications between the UE and the network node. Additionally, interference conditions may be different during downlink time intervals and full-duplex time intervals. For example, during downlink time intervals, the UE may experience interference caused by transmissions from neighboring cells. However, during full-duplex time intervals, the UE may also experience CLI from transmissions by other UEs. As a result, an IMR used to measure interference during a downlink time interval may not be useful for interference measurements during a full-duplex time interval (for example, because the source of interference is different).

Figure 9:
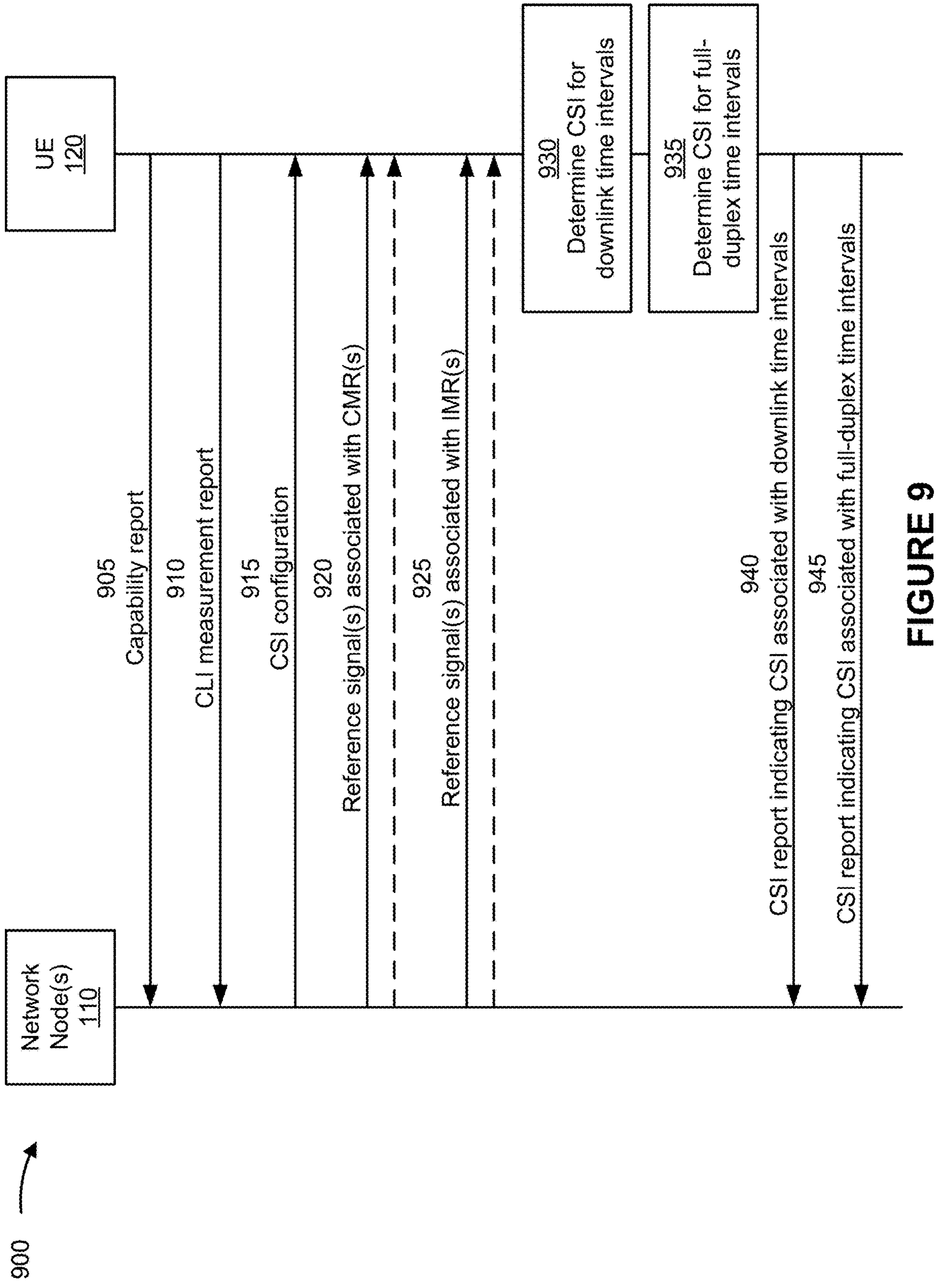
FIG. 9 is a diagram of an example associated with operations for a CSI framework for full-duplex communications in accordance with the present disclosure.

FIG. 9 is a diagram of an example associated with operations 900 for a CSI framework for full-duplex communications in accordance with the present disclosure. As shown in FIG. 9, one or more network nodes 110 (for example, a network node 210, a base station, a CU, a DU, and/or an RU) may communicate with a UE 120 (e.g., a UE 220). In some aspects, the network node 110 and the UE 120 may be part of a wireless network (for example, the wireless network 100). The UE 120 and the network node 110 may have established a wireless connection prior to operations shown in FIG. 9.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU).

In a first operation 905, the UE 120 may transmit, and the network node 110 may receive, a capability report. The UE 120 may transmit the capability report via UE capability signaling, a UE assistance information (UAI) communication, an RRC communication, a PUSCH, and/or a physical uplink control channel (PUCCH), among other examples. The capability report may indicate whether the UE 120 supports one or more operations described herein. In some aspects, the capability report may indicate whether the UE 120 supports being configured with separate CSI configurations for downlink time intervals (for example, non-full-duplex time intervals) and full-duplex time intervals (for example, SBFD time intervals). For example, the capability report may indicate whether the UE 120 supports being configured with separate CSI configurations for the full-duplex time intervals and the downlink time intervals.

In some aspects, the capability report may indicate whether the UE 120 supports receiving CSI-RSs during full-duplex time intervals (for example, during SBFD slots). For example, the capability report may indicate whether the UE 120 supports being configured with separate CSI-RS resources for downlink time intervals and full-duplex time intervals.

In some aspects, the capability report may indicate one or more capabilities associated with CSI-RS reception during full-duplex time intervals (for example, during SBFD time intervals). For example, the capability report may indicate whether the UE 120 supports reception of CSI-RSs that are non-contiguous in a frequency domain (for example, that are separated by one or more frequency domain resources). A CSI-RS that is non-contiguous in the frequency domain may be referred to as a fragmented CSI-RS. For example, the capability report may indicate whether the UE 120 supports receiving a CSI-RS where the CSI-RS is associated with frequency domain resources included in a first downlink subband and a second downlink subband, where the first downlink subband and the second downlink subband are separated in the frequency domain (for example, by one or more uplink subbands and/or by one or more guard bands).

The network node 110 may configure the UE 120 in accordance with the capability report. For example, the network node 110 may configure, or may trigger, the UE 120 to perform one or more operations based on, responsive to, or otherwise associated with the capability report indicating that the UE 120 supports the one or more operations. For example, the network node 110 may configure the UE 120 with separate CSI reporting configurations for downlink time intervals and full-duplex time intervals based on, responsive to, or otherwise associated with the capability report indicating that the UE 120 supports being configured with the separate CSI reporting configurations. As another example, the network node 110 may configure the UE 120 with a fragmented CSI-RS resource based on, responsive to, or otherwise associated with the capability report indicating that the UE 120 supports receiving fragmented CSI-RSs.

For example, if the capability report indicates that the UE 120 does not support receiving fragmented CSI-RSs, then the network node 110 may configure the UE 120 with a CSI-RS resource that is included within a single subband of a full-duplex time interval (for example, a single downlink subband of an SBFD time interval). As another example, if the capability report indicates that the UE 120 does not support receiving fragmented CSI-RSs, then the network node 110 may configure the UE 120 with a CSI-RS that is associated with an entire BWP of a downlink time interval (for example, the network node 110 may transmit a CSI-RS in a downlink time interval and the UE 120 may calculate CSI for full-duplex time intervals using the CSI-RS). As another example, if the capability report indicates that the UE 120 does support receiving fragmented CSI-RSs, then the network node 110 may configure one CSI-RS resource spanning an entire BWP of the full-duplex time interval, and resources (for example, tones) in uplink subbands and/or guard bands may be punctured (for example, not monitored and/or received by the UE 120). As another example, if the capability report indicates that the UE 120 does support receiving fragmented CSI-RSs, then the network node 110 may configure separate CSI-RS resources in respective downlink subbands of the full-duplex time interval.

In some aspects, in a second operation 910, the UE 120 may transmit, and the network node 110 may receive, a CLI measurement report. The CLI measurement report may be a measurement report indicating one or more CLI measurement values. For example, the UE 120 may be configured with one or more CLI measurement resources (for example, one or more IMRs, time domain resources, frequency domain resources, and/or spatial domain resources during which another UE is to transmit one or more uplink communications and the UE 120 is to measure CLI). For example, during the one or more CLI measurement resources, the other UE may transmit one or more uplink communications (for example, an uplink reference signal, such as a sounding reference signal (SRS)). The UE 120 may measure the one or more uplink communications to determine an amount of CLI caused at the UE 120 based on, or otherwise associated with, uplink transmissions from the other UE. The UE 120 may transmit, and the network node 110 may receive, the CLI measurement report indicating the amount of CLI (for example, indicating one or more CLI measurements performed by the UE 120). The network node 110 may determine configuration information in association with the one or more CLI measurement values. For example, the network node 110 may configure the UE 120 in accordance with the CLI measurement report. For example, the network node 110 may configure, or may trigger, the UE 120 to perform one or more operations based on, responsive to, or otherwise associated with values of the one or more CLI measurements indicated by the CLI measurement report. In some aspects, the network node 110 may configure, or may trigger, the UE 120 to perform one or more operations based on, responsive to, or otherwise associated with a value of a CLI measurement satisfying one or more CLI thresholds, as described in more detail elsewhere herein.

In a third operation 915, the network node 110 may transmit, and the UE 120 may receive, configuration information. In some aspects, the UE 120 may receive the configuration information via one or more of system information signaling. RRC signaling, one or more MAC control elements (MAC-CEs), and/or downlink control information (DCI), among other examples. In some aspects, the configuration information may include an indication of one or more configuration parameters for selection by the UE 120, and/or explicit configuration information for the UE 120 to use to configure itself, among other examples.

The network node 110 may determine the configuration information. In some aspects, the network node 110 may determine the configuration information based on, responsive to, or otherwise associated with an antenna configuration or an antenna implementation associated with the network node 110. For example, the network node 110 may determine the configuration information based on, responsive to, or otherwise associated with an RF chain (for example, a Tx chain and/or an Rx chain) configuration or implementation associated with the network node 110. In some aspects, the network node 110 may determine the configuration information based on, responsive to, or otherwise associated with an antenna configuration or an antenna implementation associated with another network node (for example, a network node that transmits and/or receives over-the-air signals associated with the UE 120, such as an RU), such as in examples where the network node 110 is a DU or a CU.

For example, the network node 110 may determine the configuration information based on, responsive to, or otherwise associated with whether an antenna configuration or RF chain configuration used by the network node 110 is the same for downlink time intervals and full-duplex time intervals. For example, the network node 110 may use the same antenna panels, antenna elements, and/or Tx chain(s) to transmit signals during both downlink time intervals and full-duplex time intervals. In other examples, the network node 110 may use a first one or more antenna panels, antenna elements, and/or Tx chain(s) to transmit signals during downlink time intervals and a second one or more antenna panels, antenna elements, and/or Tx chain(s) to transmit signals during full-duplex time intervals (for example, as described in more detail elsewhere herein, such as in connection with FIG. 8). If the network node 110 uses the same antenna configuration or RF chain configuration for downlink time intervals and full-duplex time intervals, then the network node 110 may determine first configuration information (for example, a common CSI-RS configuration and/or a common CMR configuration) for both downlink time intervals and full-duplex time intervals, as described in more detail elsewhere herein. Alternatively, if the network node 110 uses different antenna configurations or RF chain configurations for downlink time intervals and full-duplex time intervals, then the network node 110 may determine second configuration information (for example, separate CSI-RS configurations and/or separate CMR configurations for downlink time intervals and full-duplex time intervals).

Additionally or alternatively, the network node 110 may determine the configuration information based on, responsive to, or otherwise associated with CLI being experienced by the UE 120. For example, the network node 110 may determine the configuration information based on, responsive to, or otherwise associated with a CLI measurement report (for example, transmitted by the UE 120 in the second operation 910). In some aspects, the network node 110 may determine the configuration information based on, responsive to, or otherwise associated one or more CLI measurement values indicated by the CLI measurement report. For example, if the one or more CLI measurement values indicate good CLI conditions (for example, if the one or more CLI measurement values do not satisfy a CLI threshold), then the network node 110 may determine first configuration information (for example, a common IMR configuration for both downlink time intervals and full-duplex time intervals). For example, the common IMR configuration may enable the network node 110 and/or the UE 120 to conserve network resources and/or configuration signaling overhead when the UE 120 is experiencing good CLI conditions. Alternatively, if the one or more CLI measurement values indicate non-ideal or poor CLI conditions (for example, if the one or more CLI measurement values satisfy the CLI threshold), then the network node 110 may determine second configuration information (for example, separate IMR configurations for downlink time intervals and full-duplex time intervals) to enable the UE 120 to separately measure interference for downlink time intervals and full-duplex time intervals.

In some aspects, the configuration information may include a CSI configuration. For example, the configuration information may include a CSI report configuration or a CSI report setting, among other examples. In some aspects, the configuration information may indicate one or more CSI-RS resource configurations. The one or more CSI-RS resource configurations may be NZP CSI-RS resource configurations. In some aspects, the one or more CSI-RS resource configurations may be, or may be included in, one or more CMR configurations. Additionally or alternatively, the one or more CSI-RS resource configurations may be, or may be included in, one or more IMR configurations. The configuration information may indicate a CSI report configuration or a CSI reporting setting. The CSI report configuration or the CSI reporting setting may indicate the multiple CSI-RS resource configurations. In some aspects, the one or more CSI-RS resource configurations may be included in one or more CSI-RS resource sets.

In some aspects, the configuration information may indicate a common CSI configuration (for example, a common CSI report configuration, one or more common CSI-RS resources, and/or one or more common IMRs) associated with both downlink time intervals and full-duplex time intervals (for example, for both downlink slots and SBFD slots). As used herein, a "common" configuration or "common" resource may refer to a configuration or resource that may be used by the UE 120 to calculate CSI associated with both downlink time intervals and full-duplex time intervals. For example, the configuration information may indicate one or more common CSI-RS configurations (for example, for CMRs) for both downlink time intervals and full-duplex time intervals. In some aspects, the configuration information may indicate the one or more common CSI-RS configurations (also referred to herein as a common CSI resource configuration) and/or the one or more common CMR configurations based on, or otherwise associated with, the network node 110 using the same antenna configuration or RF chain configuration for downlink time intervals and full-duplex time intervals (for example, in a similar manner as the second antenna configuration 835 depicted in FIG. 8).

For example, the configuration information may indicate a CSI-RS resource configuration that is to be used by the UE 120 to calculate CSI for both the downlink time intervals and full-duplex time intervals. In some aspects, the CSI-RS resource configuration (for example, a common CSI-RS configuration) may indicate that a CSI-RS is to be transmitted during downlink time intervals. In other aspects, the CSI-RS resource configuration (for example, a common CSI-RS configuration) may indicate that a CSI-RS is to be transmitted during full-duplex time intervals.

In some aspects, the configuration information may indicate a common IMR configuration. For example, the configuration information may indicate an IMR that is associated with measuring interference for both downlink time intervals and full-duplex time intervals. For example, the configuration information may indicate the common IMR configuration based on, or otherwise associated with, CLI conditions at the UE 120. In some aspects, the configuration information may indicate the common IMR configuration based on, or otherwise associated with, the UE experiencing good CLI conditions (for example, little or no CLI measured by the UE 120, such as indicated by the CLI measurement reported transmitted by the UE 120 in the second operation 910). In some aspects, the common IMR configuration may indicate that a reference signal (for example, a CSI-RS) is to be transmitted during downlink time intervals (for example, the common IMR may be configured to occur during one or more downlink time intervals). Alternatively, the common IMR configuration may indicate that a reference signal (for example, a CSI-RS) is to be transmitted during full-duplex time intervals (for example, the common IMR may be configured to occur during one or more full-duplex time intervals).

In other aspects, the configuration information may indicate separate CSI configurations for downlink time intervals and full-duplex time intervals (for example, separate CSI-RS resource configurations, separate CMR configurations, and/or separate IMR configurations). For example, the configuration information may indicate a first CSI configuration associated with downlink time intervals and a second CSI configuration associated with full-duplex time intervals. In some aspects, the configuration information may indicate a first CSI report configuration or a first CSI report setting associated with downlink time intervals. The configuration information may indicate a second CSI report configuration or a second CSI report setting associated with full-duplex time intervals.

For example, the configuration information may indicate a first CSI resource configuration associated with full-duplex time intervals and a second CSI resource configuration associated with downlink time intervals. The first CSI resource configuration may be, or may be associated with, a first CMR configuration. The second CSI resource configuration may be, or may be associated with, a second CMR configuration. In some aspects, the configuration information may indicate the separate CSI resource configurations and/or separate CMR configurations based on, or otherwise associated with, the network node 110 using different antenna configurations or different RF chain configurations for downlink time intervals and full-duplex time intervals (for example, in a similar manner as the first antenna configuration 800 depicted in FIG. 8).

In some aspects, the first CSI resource configuration may indicate that a CSI-RS to be measured by the UE 120 to calculate CSI for downlink time intervals is to occur (for example, be transmitted during) one or more downlink time intervals. The second CSI resource configuration may indicate that a CSI-RS to be measured by the UE 120 to calculate CSI for full-duplex time intervals is to occur (for example, be transmitted during) one or more full-duplex time intervals. In other aspects, the second CSI resource configuration may indicate that a CSI-RS to be measured by the UE 120 to calculate CSI for full-duplex time intervals is to occur (for example, be transmitted during) one or more downlink time intervals. In such examples, the UE 120 may be configured to calculate the CSI based on, or otherwise associated with, the antenna configuration used by the network node 110 during full-duplex time intervals (for example, based on, or otherwise associated with CSI-RS ports or antenna ports used by the network node 110 during full-duplex time intervals), as explained in more detail elsewhere herein.

In some aspects, the configuration information may indicate separate IMR configurations associated with downlink time intervals and full-duplex time intervals. For example, the configuration information may indicate a first IMR configuration associated with full-duplex time intervals and a second IMR configuration associated with downlink time intervals. The first IMR configuration may configure a first one or more IMRs and the second IMR configuration may configure a second one or more IMRs. The first IMR configuration associated with full-duplex time intervals may indicate that an IMR is to occur (for example, is to be transmitted during) one or more full-duplex time intervals. The second IMR configuration associated with downlink time intervals may indicate that an IMR is to occur (for example, is to be transmitted during) one or more downlink time intervals. For example, the IMR configuration associated with full-duplex time intervals may configure the UE 120 to measure interference during full-duplex time intervals to enable the UE 120 to measure interference that may only occur during full-duplex time intervals (for example, CLI). The IMR configuration associated with downlink time intervals may configure the UE 120 to measure interference during downlink time intervals to enable the UE 120 to measure interference that occurs during downlink time intervals (for example, interference from neighboring cells) and to not measure interference that may only occur during full-duplex time intervals.

In some aspects, the configuration information may indicate separate IMR configurations associated with downlink time intervals and full-duplex time intervals based on, or otherwise associated with, CLI conditions at the UE 120. In some aspects, the configuration information may indicate the separate IMR configurations based on, or otherwise associated with, the UE 120 experiencing poor or non-ideal CLI conditions. For example, the configuration information may indicate the separate IMR configurations based on, responsive to, or otherwise associated with, the UE 120 transmitting an indication of one or more CLI measurements that satisfy the CLI threshold (for example, via the CLI measurement report transmitted by the UE 120 in the second operation 910). In other words, if the UE 120 is experiencing some level of CLI, then the network node 110 may configure the UE 120 with separate IMR configurations to enable the UE 120 to separately measure interference for downlink time intervals and full-duplex time intervals.

For example, in scenarios where the network node 110 is using the same antenna configuration or RF chain configuration for downlink time intervals and full-duplex time intervals (for example, in a similar manner as the second antenna configuration 835 depicted in FIG. 8) and CLI conditions at the UE 120 are good (for example, little or no CLI), the configuration information may indicate a common CLI resource configuration (for example, the network node 110 may configure one CSI-RS resource for channel measurement) and a common IMR configuration (for example, the network node may configure one IMR for interference measurement). In such examples, the configuration information may indicate that the UE 120 is to transmit one CSI measurement report (for example, that is applicable to both downlink time intervals and full-duplex time intervals).

As another example, in scenarios where the network node 110 is using the same antenna configuration or RF chain configuration for downlink time intervals and full-duplex time intervals (for example, in a similar manner as the second antenna configuration 835 depicted in FIG. 8) and CLI conditions at the UE 120 are poor or non-ideal (for example, where the UE 120 is experiencing CLI), the configuration information may indicate a common CSI resource configuration associated with both the full-duplex time intervals and the downlink time intervals, a first IMR configuration associated with full-duplex time intervals, and a second IMR configuration associated with downlink time intervals. In other words, the network node 110 may configure the UE 120 with a common CSI-RS resource for channel measurement (for example, one CSI-RS resource that is to be measured as a CMR and is applicable for CLI calculation for both downlink time intervals and full-duplex time intervals) and separate IMR configurations. In such examples, the configuration information may indicate that the UE 120 is to transmit separate CSI measurement reports (for example, a first CSI measurement report associated with downlink time intervals and a second CSI measurement report associated with full-duplex time intervals).

As another example, in scenarios where the network node 110 is using different antenna configurations or different RF chain configurations for downlink time intervals and full-duplex time intervals (for example, in a similar manner as the first antenna configuration 800 depicted in FIG. 8) and CLI conditions at the UE 120 are good, the configuration information may indicate a first CSI resource configuration for full-duplex time intervals, a second CSI resource configuration for downlink time intervals, and a common IMR configuration for both full-duplex time intervals and downlink time intervals. In other words, the network node 110 may configure the UE 120 to measure different CSI-RSs for channel measurements associated with full-duplex time intervals and downlink time intervals. Because the CLI conditions at the UE 120 are good (for example, the UE 120 may be experiencing little or no CLI during full-duplex time intervals), the UE 120 may be configured with a common IMR for interference measurement to conserve network resources and/or configuration signaling overhead. The common IMR may be configured to occur during one or more downlink time intervals (for example, to enable the UE 120 to measure interference caused by transmissions from neighboring cells). In such examples, the configuration information may indicate that the UE 120 is to transmit separate CSI measurement reports (for example, a first CSI measurement report associated with downlink time intervals and a second CSI measurement report associated with full-duplex time intervals).

As another example, in scenarios where the network node 110 is using different antenna configurations or different RF chain configurations for downlink time intervals and full-duplex time intervals (for example, in a similar manner as the first antenna configuration 800 depicted in FIG. 8) and CLI conditions at the UE 120 are poor or non-ideal (for example, where the UE 120 is experiencing CLI), the configuration information may indicate a first CSI resource configuration for full-duplex time intervals, a second CSI resource configuration for downlink time intervals, a first IMR configuration associated with full-duplex time intervals, and a second IMR configuration associated with downlink time intervals. For example, the UE 120 may be configured to measure different CMRs for channel measurements associated with downlink time intervals and full-duplex time intervals. Additionally, the UE 120 may be configured to measure different IMRs for interference measurements associated with downlink time intervals and full-duplex time intervals. In such examples, the configuration information may indicate that the UE 120 is to transmit separate CSI measurement reports (for example, a first CSI measurement report associated with downlink time intervals and a second CSI measurement report associated with full-duplex time intervals).

In some aspects, a first CSI resource configuration and a second CSI resource configuration described herein may configure separate CSI-RS resources. In some aspects, a CSI-RS resource associated with full-duplex time intervals (for example, indicated by a CSI resource configuration associated with full-duplex time intervals) may be configured as a subset of a CSI-RS resource associated with downlink time intervals (for example, indicated by a CSI resource configuration associated with downlink time intervals). For example, Tx chains and/or antenna panels (or antenna elements) used by the network node 110 for downlink transmissions during full-duplex time intervals may be a subset of Tx chains and/or antenna panels (or antenna elements) used by the network node 110 for downlink transmissions during downlink time intervals. In some aspects, precoding applied by the network node 110 for CSI-RS ports (for example, antenna ports associated with transmissions of CSI-RSs) may be the same for downlink transmissions during downlink time intervals and full-duplex time intervals. In other aspects, precoding applied by the network node 110 for CSI-RS ports (for example, antenna ports associated with transmissions of CSI-RSs) may be different for downlink transmissions during downlink time intervals and full-duplex time intervals. In some aspects, beamforming applied by the network node 110 for CSI-RS transmissions during downlink time intervals and full-duplex time intervals may be the same. In other aspects, beamforming applied by the network node 110 for CSI-RS transmissions during downlink time intervals and full-duplex time intervals may be different.

Where the beamforming applied by the network node 110 is different, the configuration information may indicate a first CSI-RS resource associated with measuring and/or calculating CSI for downlink time intervals (for example, that is configured to be transmitted by the network node 110 during one or more downlink time intervals). Additionally, the configuration information may indicate a second CSI-RS resource associated with measuring and/or calculating CSI for full-duplex time intervals (for example, that is configured to be transmitted by the network node 110 during one or more full-duplex time intervals or one or more downlink time intervals).

For example, the configuration information may indicate a first one or more beamforming parameters associated with the first CSI-RS resource and a second one or more beamforming parameters associated with the second CSI-RS resource. The beamforming parameters may include a quantity of CSI-RS ports, a quantity of antenna ports, a codebook, a precoder, a precoding matrix, and/or an antenna array, among other examples. For example, the first CSI-RS resource and the second CSI-RS resource may be configured with a different quantity of CSI-RS ports. For example, the first CSI-RS resource may be configured with a first quantity of CSI-RS ports and the second CSI-RS resource may be configured with a second quantity of CSI-RS ports (for example, the second CSI-RS resource may be configured with a subset of CSI-RS ports from a set of CSI-RS ports configured for the first CSI-RS resource).

Where beamforming applied by the network node 110 is the same, a CSI-RS resource associated with measuring and/or calculating CSI for full-duplex time intervals may be configured as a subset of a CSI-RS resource associated with measuring and/or calculating CSI for downlink time intervals. For example, a first CSI resource configuration (for example, configuring a CSI-RS resource associated with downlink time interval CSI calculations) may indicate a set of resources associated with a first CSI-RS and a second CSI resource configuration (for example, a CSI-RS resource associated with full-duplex time interval CSI calculations) may indicate a subset of resources, from the set of resources, associated with the first CSI-RS.

In some aspects, the set of resources may include a set of CSI-RS ports, and/or a set of antenna ports, among other examples. For example, the set of resources may include an array of CSI-RS ports or antenna ports (for example, having an array size with dimensions (N1, N2)=(X, Y)). The configuration information may indicate the subset of resources via an array size (for example, with dimensions (N1, N2)=(M, N), where M is less than or equal to X and N is less than or equal to Y) and an offset indicating a subset of CSI-RS ports from the array of CSI-RS ports. For example, the array of CSI-RS ports may be a two-dimensional array. The configuration information may indicate an array size and an antenna port offset indicating which CSI-RS ports, from the two-dimensional array, are associated with a CSI-RS resource associated with full-duplex time interval CSI calculations. In such examples, the CSI-RS channel estimation may be shared (for example, may be performed from a common CSI-RS) for downlink CSI calculations and full-duplex CSI calculations.

As another example, the configuration information may indicate the subset of resources via an index of a row in a CSI-RS location table. For example, a wireless communication standard, such as the 3GPP, may define, or otherwise fix, a CSI-RS location table that includes one or more rows. Each row may define CSI-RS locations within a slot. One or more rows included in the CSI-RS location table may define CSI-RS locations within a slot to indicate a subset of CSI-RS ports. For example, a subset pattern may be defined as an index for a row in the CSI-RS location table. In such examples, the CSI-RS channel estimation may be shared (for example, may be performed from a common CSI-RS) for downlink CSI calculations and full-duplex CSI calculations.

In some aspects, the configuration information may indicate separate power offset values for CSI-RSs associated with downlink time intervals and full-duplex time intervals. In some examples, a CSI-RS resource may be configured with a power control offset value (for example, in a powerControlOffset information element of a CSI-RS resource configuration, such as an NZP-CSI-RS-Resource configuration). The power control offset value may also be referred to as a power offset value or a Pc value. The power control offset value may indicate a ratio of a power associated with the CSI-RS to a power associated with a downlink data channel (for example, a physical downlink shared channel (PDSCH)). For example, the power control offset value may be a value in decibels (dB), represented as $$10\log_{10}\frac{P_{PDSCH}}{P_{CSI-RS}},$$

where $P_{PDSCH}$ is the power associated with the downlink data channel (for example, the PDSCH) and $P_{CSI-RS}$ is the power associated with the CSI-RS. For example, the UE 120 may modify the measured signal strength or power of the CSI-RS in accordance with a power control offset value indicated by a CSI-RS resource configuration associated with the CSI-RS. The UE 120 may use the modified signal strength or power to calculate a CSI (such as a CQI) for a downlink channel (for example, for the PDSCH). The configuration information may indicate a first power offset value associated with the full-duplex time intervals and a second power offset value associated with the downlink time intervals.

In some aspects, the configuration information may indicate frequency domain resources for CSI calculations associated with full-duplex time intervals. For example, the configuration information may indicate one or more CSI subbands associated with the full-duplex time intervals. "CSI subband" may refer to a subband for which the UE 120 is to report CSI to the network node 110. The one or more CSI subbands may be downlink subbands of a SBFD time interval. For example, the one or more CSI subbands may include one or more (or all) downlink subbands of the SBFD time interval. In some aspects, the UE 120 may use CMR and/or IMR measurements only from the one or more CSI subbands when calculating CSI for full-duplex time intervals. In other words, CSI for the full-duplex time intervals may be calculated from one or more measurements associated with the one or more CSI subbands.

In a fourth operation 920, the network node 110 may transmit, and the UE 120 may receive, one or more reference signals associated with one or more CMRs (for example, one or more CMRs configured via the configuration information). For example, the one or more reference signals may be one or more CSI-RSs. The network node 110 may transmit the one or more reference signals in accordance with the configuration information. For example, if a common CSI-RS resource is configured, then the network node 110 may transmit, and the UE 120 may receive, a CSI-RS that uses resources configured by the common CSI-RS resource configuration (for example, during a downlink time interval or a full-duplex time interval). The UE 120 may measure the CSI-RS (for example, the common CSI-RS). For example, the UE 120 may perform one or more channel measurements via the CSI-RS. The one or more channel measurements may be RSRP measurements, RSRQ measurements, signal-to-noise ratio (SNR) measurements, or another type of channel measurement.

If separate CSI-RSs are configured, then the network node 110 may transmit, and the UE 120 may receive, a first CSI-RS using resources configured by a CSI-RS resource configuration that is associated with full-duplex CSI (for example, during a full-duplex time interval or during a downlink time interval). The network node 110 may transmit the first CSI-RS using an antenna configuration and/or a beamforming configuration that is associated with full-duplex operations at the network node 110. The UE 120 may measure the first CSI-RS (for example, the CSI-RS associated with full-duplex CSI). For example, the UE 120 may perform one or more channel measurements via the first CSI-RS. The one or more channel measurements may be RSRP measurements, RSRQ measurements, SNR measurements, or another type of channel measurement.

Additionally, if separate CSI-RSs are configured, then the network node 110 may transmit, and the UE 120 may receive, a second CSI-RS using resources configured by a CSI-RS resource configuration that is associated with downlink CSI (for example, during a downlink time interval). The network node 110 may transmit the second CSI-RS using an antenna configuration and/or a beamforming configuration that is associated with non-full-duplex operations (for example, downlink operations) at the network node 110. The UE 120 may measure the second CSI-RS (for example, the CSI-RS associated with downlink CSI). For example, the UE 120 may perform one or more channel measurements via the second CSI-RS. The one or more channel measurements may be RSRP measurements, RSRQ measurements, SNR measurements, or another type of channel measurement.

In a fifth operation 925, the network node 110 may transmit, and the UE 120 may receive, one or more reference signals associated with one or more IMRs (for example, one or more IMRs configured via the configuration information). For example, the one or more reference signals may be one or more CSI-RSs. The network node 110 may transmit the one or more reference signals in accordance with the configuration information. For example, if a common IMR is configured, then the network node 110 may transmit, and the UE 120 may receive, a CSI-RS that uses resources configured by the common IMR configuration (for example, during a downlink time interval or a full-duplex time interval). The UE 120 may measure the CSI-RS (for example, the common CSI-RS). For example, the UE 120 may perform one or more interference measurements via the CSI-RS.

If separate IMRs are configured, then the network node 110 may transmit, and the UE 120 may receive, a first reference signal using resources configured by an IMR configuration that is associated with full-duplex CSI (for example, during a full-duplex time interval). The UE 120 may measure the first reference signal. For example, the UE 120 may perform one or more interference measurements via the first reference signal. Additionally, if separate IMRs are configured, then the network node 110 may transmit, and the UE 120 may receive, a second reference signal using resources configured by an IMR configuration that is associated with downlink CSI (for example, during a downlink time interval). The UE 120 may measure the second reference signal. For example, the UE 120 may perform one or more interference measurements via the second reference signal.

In a sixth operation 930, the UE 120 may determine first CSI associated with the downlink time intervals. For example, the UE 120 may calculate the first CSI using one or more measurements of reference signals, such as reference signals received by the UE 120 in the fourth operation 920 and/or the fifth operation 925. The first CSI may include a CQI, a precoding matrix indicator (PMI), a CSI-RS resource indicator (CRI), a synchronization signal block resource indicator (SSBRI), a layer indicator (LI), a rank indicator (RI), and/or an RSRP (for example, a layer 1 (L1) RSRP), among other examples. For example, the first CSI may include information calculated using a measurement of a common CMR or a CMR associated with downlink time intervals. Additionally, the first CSI may include information calculated using a measurement of a common IMR or an IMR associated with downlink time intervals.

For example, if a common CMR and separate IMRs are configured for the UE 120, then the UE 120 may measure a CSI-RS indicated by (or configured via) the common CMR. The UE 120 may measure, during a downlink time interval, an IMR configured via an IMR associated with downlink time interval CSI. In such examples, the first CSI may be based on, calculated using, or otherwise associated with the measurement of the CSI-RS and the measurement of the IMR. As another example, if separate CMRs and separate IMRs are configured, then the UE 120 may measure a CSI-RS indicated by (or configured via) a CMR or a CSI-RS resource configuration associated with downlink time interval CSI. The UE 120 may measure, during a downlink time interval, an IMR configured via an IMR associated with downlink time interval CSI. In such examples, the first CSI may be based on, calculated using, or otherwise associated with the measurement of the CSI-RS and the measurement of the IMR.

In a seventh operation 935, the UE 120 may determine second CSI associated with the full-duplex time intervals. For example, the UE 120 may calculate the second CSI using one or more measurements of reference signals, such as reference signals received by the UE 120 in the fourth operation 920 and/or the fifth operation 925. The second CSI may include a CQI, a PMI, a CRI, an SSBRI, an LI, an RI, and/or an RSRP (for example, an L1 RSRP), among other examples. For example, the second CSI may include information calculated using a measurement of a common CMR or a CMR associated with full-duplex time intervals. Additionally, the first CSI may include information calculated using a measurement of a common IMR or an IMR associated with full-duplex time intervals.

For example, if a common CMR and separate IMRs are configured for the UE 120, then the UE 120 may measure a CSI-RS indicated by (or configured via) the common CMR. The UE 120 may measure, during a full-duplex time interval, an IMR configured via an IMR associated with full-duplex time interval CSI. In such examples, the second CSI may be based on, calculated using, or otherwise associated with the measurement of the CSI-RS and the measurement of the IMR. As another example, if separate CMRs and separate IMRs are configured, then the UE 120 may measure a CSI-RS indicated by (or configured via) a CMR or an CSI-RS resource configuration associated with full-duplex time interval CSI. The UE 120 may measure, during a downlink time interval, an IMR configured via an IMR associated with full-duplex time interval CSI. In such examples, the second CSI may be based on, calculated using, or otherwise associated with the measurement of the CSI-RS and the measurement of the IMR.

In some aspects, the UE 120 may calculate the second CSI using a CSI-RS or other reference signal that is received during a downlink time interval (for example, during a downlink slot). For example, the UE 120 may receive a CSI-RS using a set of resources (for example, a set of CSI-RS ports). In such examples, the UE 120 may measure and/or calculate the second CSI using a subset of resources (for example, a subset of CSI-RS ports) that are configured for full-duplex time intervals, as described in more detail elsewhere herein. In some aspects, the UE 120 may calculate the second CSI using a CSI-RS or other reference signal that is received during a full-duplex time interval (for example, during an SBFD slot). In some examples, the CSI-RS may be fragmented or non-contiguous in the frequency domain. In such examples, the UE 120 may refrain from calculating the second CSI using information associated with frequency domain resources that are not included in downlink subbands and/or CSI subbands of the SBFD slot. In other examples, the UE 120 may measure separate CSI-RS resources during the SBFD slot (for example, a first CSI-RS resource included in a first downlink subband and a second CSI-RS resource included in a second downlink subband). In such examples, the UE 120 may determine or calculate the second CSI using measurements of all of the CSI-RS resources associated with the full-duplex time interval CSI.

In an eighth operation 940, the UE 120 may transmit, and the network node 110 may receive, a CSI report indicating CSI (for example, the first CSI) associated with downlink time intervals. For example, the UE 120 may transmit, and the network node 110 may receive, a first CSI report indicating the first CSI associated with the downlink time intervals in accordance with the configuration information. For example, the first CSI may be calculated in accordance with the configuration information by calculating the first CSI using measurements of CMR(s) and/or IMR(s) that are configured as common or as being associated with downlink CSI. The first CSI report may be transmitted via a PUSCH or a PUCCH.

In a ninth operation 945, the UE 120 may transmit, and the network node 110 may receive, a CSI report indicating CSI (for example, the second CSI) associated with full-duplex time intervals. For example, the UE 120 may transmit, and the network node 110 may receive, a second CSI report indicating the second CSI associated with the full-duplex time intervals in accordance with the configuration information. For example, the second CSI may be calculated in accordance with the configuration information by calculating the second CSI using measurements of CMR(s) and/or IMR(s) that are configured as common or as being associated with full-duplex CSI. The second CSI report may be transmitted via a PUSCH or a PUCCH.

For example, the UE 120 may transmit separate CSI reports for full-duplex time intervals and for downlink time intervals. In other examples, the UE 120 may transmit a single CSI report for both full-duplex time intervals and for downlink time intervals. For example, if a common CMR and a common IMR are configured, then the UE 120 may transmit a single CSI report where the CSI indicated by the single CSI report is applicable to both full-duplex time intervals and downlink time intervals.

The network node 110 may perform one or more operations based on, responsive to, or otherwise associated with the first CSI and/or the second CSI. For example, the network node 110 may configure a first one or more communication parameters to be used during downlink time intervals based on, responsive to, or otherwise associated with the first CSI (for example, indicated by the first CSI report received during the eighth operation 940). The network node 110 may configure a second one or more communication parameters to be used during full-duplex time intervals based on, responsive to, or otherwise associated with the second CSI (for example, indicated by the second CSI report received during the ninth operation 945).

FIG. 10 is a diagram of an example associated with a table 1000 showing different CSI configurations for downlink and full-duplex in accordance with the present disclosure. The configuration information depicted in FIG. 10 may be configured for a UE 120 (for example, by a network node 110), in a similar manner as described elsewhere herein, such as in connection with FIG. 9 and the third operation 915.

As shown in FIG. 10, the CSI configuration for downlink and full-duplex (for example, SBFD) may be based on, or otherwise associated with an antenna configuration (or an RF chain configuration) of the network node 110 and/or CLI conditions at the UE 120. The antenna configuration 1 referenced in FIG. 10 may be similar to the second antenna configuration 835. The antenna configuration 2 referenced in FIG. 10 may be similar to the first antenna configuration 800.

For example, if the network node 110 is using (or is implemented with) the antenna configuration 1 and CLI conditions at the UE 120 are good (for example, little or no CLI measured or reported by the UE 120), then the UE 120 may be configured with a common CSI-RS configuration for both downlink time intervals and full-duplex time intervals. For example, a CMR for downlink (DL) and a CMR for full-duplex (FD) may be indicated by the common CSI-RS configuration. Similarly, the UE 120 may be configured with a common IMR configuration. An IMR for downlink may be indicated by the common IMR configuration, and an IMR configuration for full-duplex may be indicated by the common IMR configuration. In such examples, the UE 120 may measure a single CMR and a single CMR to calculate the CSI. Additionally, the UE 120 may transmit a single CSI report indicating the CSI for both downlink and full-duplex (for example, no separate CSI reporting).

As another example, if the network node 110 is using (or is implemented with) the antenna configuration 1 and CLI conditions at the UE 120 are poor (for example, CLI measured or reported by the UE 120 satisfies a CLI threshold), then the UE 120 may be configured with the common CSI-RS configuration and separate IMR configurations. For example, a CMR for downlink and a CMR for full-duplex may be indicated by the common CSI-RS configuration. An IMR for downlink may be indicated by an IMR configuration associated with downlink CSI. Additionally, an IMR for full-duplex may be indicated by an IMR configuration associated with full-duplex CSI. In such examples, the UE 120 may transmit separate CSI reports for full-duplex and downlink CSI.

As another example, if the network node 110 is using (or is implemented with) the antenna configuration 2 and CLI conditions at the UE 120 are good (for example, little or no CLI measured or reported by the UE 120), then the UE 120 may be configured with separate CSI-RS configurations for downlink time intervals and full-duplex time intervals. For example, a CMR for downlink may be indicated by a CSI-RS configuration that is associated with downlink CSI. A CMR for full-duplex may be indicated by a CSI-RS configuration associated with full-duplex CSI. In such examples, UE 120 may be configured with a common IMR configuration. An IMR for downlink may be indicated by the common IMR configuration and an IMR configuration for full-duplex may be indicated by the common IMR configuration. The UE 120 may transmit separate CSI reports for full-duplex and downlink CSI.

As another example, if the network node 110 is using (or is implemented with) the antenna configuration 2 and CLI conditions at the UE 120 are poor (for example, CLI measured or reported by the UE 120 satisfies a CLI threshold), then the UE 120 may be configured with separate CSI-RS configurations for downlink time intervals and full-duplex time intervals. Additionally, the UE 120 may be configured with separate IMR configurations for downlink time intervals and full-duplex time intervals. For example, a CMR for downlink may be indicated by a CSI-RS configuration that is associated with downlink CSI. A CMR for full-duplex may be indicated by a CSI-RS configuration associated with full-duplex CSI. Additionally, an IMR for downlink may be indicated by an IMR configuration associated with downlink CSI. An IMR for full-duplex may be indicated by an IMR configuration associated with full-duplex CSI. In such examples, the UE 120 may transmit separate CSI reports for full-duplex and downlink CSI.

Figure 11:
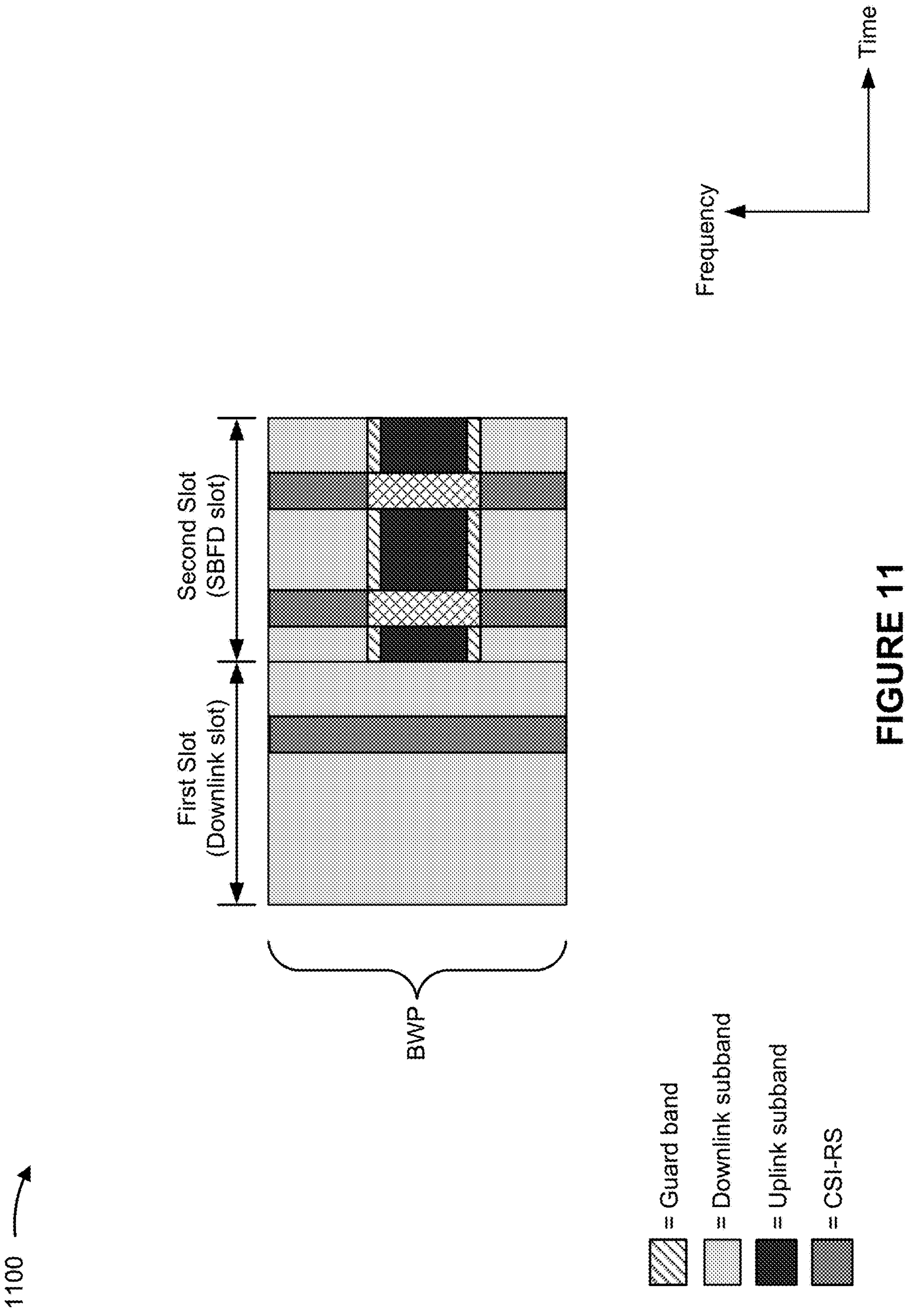
FIG. 11 is a diagram of an example associated with CSI reference signal locations for downlink and full-duplex CSI in accordance with the present disclosure.

FIG. 11 is a diagram of an example associated with CSI-RS locations 1100 for downlink and full-duplex CSI in accordance with the present disclosure. FIG. 11 depicts an example downlink time interval (for example, a first slot that is a downlink slot) and an example full-duplex time interval (for example, a second slot that is an SBFD slot).

As shown in FIG. 11, a CSI-RS may be configured in a BWP configured for the UE 120 during the downlink slot. For example, the CSI-RS may be associated with all frequency domain resources of the BWP. The CSI-RS in the downlink slot may be measured and/or used for CSI calculations associated with downlink time intervals, as described in more detail elsewhere herein. In some aspects, the CSI-RS in the downlink slot may be measured and/or used for CSI calculations associated with full-duplex time intervals. For example, the UE 120 may receive an indication of resources (for example, CSI-RS ports, frequency domain resources, or other resources) from the CSI-RS that are to be used to calculate the CSI associated with full-duplex time intervals (for example, when a CSI-RS included in the downlink slot is used for CSI calculations associated with full-duplex time intervals). As another example, the CSI-RS in the downlink slot may be transmitted by a network node 110 using an antenna configuration and/or an RF chain configuration that is associated with full-duplex operations at the network node 110 (for example, when a CSI-RS included in the downlink slot is used for CSI calculations associated with full-duplex time intervals).

Additionally, as shown in FIG. 11, a CSI-RS may be configured to occur during an SBFD slot. Because the CSI-RS is a downlink reference signal, only downlink frequency domain resources (for example, downlink subbands) in the SBFD slot may be associated with the CSI-RS. In some aspects, the CSI-RS may be configured for the full BWP (for example, may be configured to use the full BWP) and frequency domain resources associated with uplink subbands and/or guard bands may be punctured and/or not monitored by the UE 120 (for example, when measuring and/or receiving the CSI-RS). In other aspects, separate CSI-RS resources may be configured for respective downlink subbands. In some aspects, a single CSI-RS resource may be configured within a given downlink subband (for example, the UE 120 may measure and report CSI only for the given downlink subband).

Figure 12:
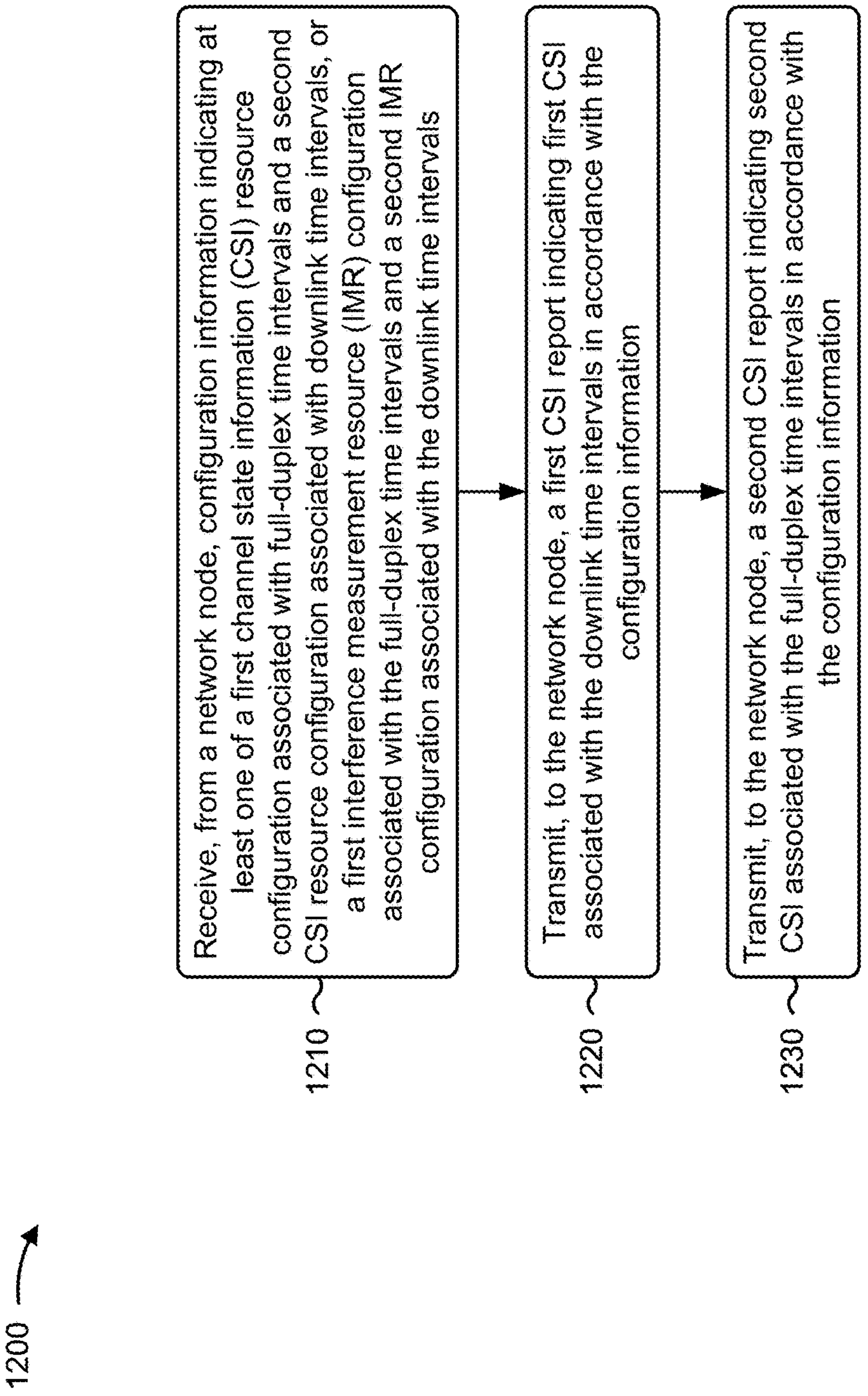
FIG. 12 is a flowchart illustrating an example process performed, for example, by a UE that supports a CSI framework for full-duplex operations in accordance with the present disclosure.

FIG. 12 is a flowchart illustrating an example process 1200 performed, for example, by a UE that supports a CSI framework for full-duplex operations in accordance with the present disclosure. Example process 1200 is an example where the UE (for example, UE 120 or UE 220) performs operations associated with a CSI framework for full-duplex operations.

As shown in FIG. 12, in some aspects, process 1200 may include receiving, from a network node, configuration information indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals (block 1210). For example, the UE (such as by using communication manager 140 or reception component 1402, depicted in FIG. 14) may receive, from a network node, configuration information indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals, as described above.

As further shown in FIG. 12, in some aspects, process 1200 may include transmitting, to the network node, a first CSI report indicating first CSI associated with the downlink time intervals in accordance with the configuration information (block 1220). For example, the UE (such as by using communication manager 140 or transmission component 1404, depicted in FIG. 14) may transmit, to the network node, a first CSI report indicating first CSI associated with the downlink time intervals in accordance with the configuration information, as described above.

As further shown in FIG. 12, in some aspects, process 1200 may include transmitting, to the network node, a second CSI report indicating second CSI associated with the full-duplex time intervals in accordance with the configuration information (block 1230). For example, the UE (such as by using communication manager 140 or transmission component 1404, depicted in FIG. 14) may transmit, to the network node, a second CSI report indicating second CSI associated with the full-duplex time intervals in accordance with the configuration information, as described above.

Process 1200 may include additional aspects, such as any single aspect or any combination of aspects described below or in connection with one or more other processes described elsewhere herein.

In a first additional aspect, process 1200 includes transmitting, to the network node, a measurement report indicating one or more cross-link interference measurement values, the configuration information being configured in association with the one or more cross-link interference measurement values.

In a second additional aspect, alone or in combination with the first aspect, the configuration information indicates a common CSI resource configuration associated with both the full-duplex time intervals and the downlink time intervals, the first IMR configuration, and the second IMR configuration.

In a third additional aspect, alone or in combination with one or more of the first and second aspects, process 1200 includes measuring a CSI-RS indicated by the common CSI resource configuration, measuring, during a full-duplex time interval, a first IMR indicated by the first IMR configuration, and measuring, during a downlink time interval, a second IMR indicated by the second IMR configuration, where the first CSI includes information calculated using the measurement of the CSI-RS and the measurement of the second IMR, and where the second CSI includes information calculated using the measurement of the CSI-RS and the measurement of the first IMR.

In a fourth additional aspect, alone or in combination with one or more of the first through third aspects, the configuration information indicates the first CSI resource configuration, the second CSI resource configuration, and a common IMR configuration for both the full-duplex time intervals and the downlink time intervals.

In a fifth additional aspect, alone or in combination with one or more of the first through fourth aspects, process 1200 includes measuring a first CSI-RS indicated by the first CSI resource configuration, measuring a second CSI-RS indicated by the second CSI resource configuration, and measuring an IMR indicated by the common IMR configuration, where the first CSI includes information calculated using the measurement of the second CSI-RS and the measurement of the IMR, and where the second CSI includes information calculated using the measurement of the first CSI-RS and the measurement of the IMR.

In a sixth additional aspect, alone or in combination with one or more of the first through fifth aspects, process 1200 includes measuring a first CSI-RS indicated by the first CSI resource configuration, measuring a second CSI-RS indicated by the second CSI resource configuration, measuring, during a full-duplex time interval, a first IMR indicated by the first IMR configuration, and measuring, during a downlink time interval, a second IMR indicated by the second IMR configuration, where the first CSI includes information calculated using the measurement of the second CSI-RS and the measurement of the second IMR, and where the second CSI includes information calculated using the measurement of the first CSI-RS and the measurement of the first IMR.

In a seventh additional aspect, alone or in combination with one or more of the first through sixth aspects, the first CSI resource configuration indicates a first one or more beamforming parameters and the second CSI resource configuration indicates a second one or more beamforming parameters.

In an eighth additional aspect, alone or in combination with one or more of the first through seventh aspects, the first CSI resource configuration indicates a set of resources associated with a first CSI-RS and the second CSI resource configuration indicates a subset of resources, from the set of resources, associated with the first CSI-RS.

In a ninth additional aspect, alone or in combination with one or more of the first through eighth aspects, the set of resources includes a set of CSI-RS ports.

In a tenth additional aspect, alone or in combination with one or more of the first through ninth aspects, the set of resources includes an array of CSI-RS ports and the configuration information indicates the subset of resources via an array size and an offset indicating a subset of CSI-RS ports from the array of CSI-RS ports.

In an eleventh additional aspect, alone or in combination with one or more of the first through tenth aspects, the configuration information indicates the subset of resources via an index of a row in a CSI-RS location table.

In a twelfth additional aspect, alone or in combination with one or more of the first through eleventh aspects, process 1200 includes transmitting, to the network node, a capability report indicating that the UE supports being configured with separate CSI configurations for the full-duplex time intervals and the downlink time intervals, the configuration information including the first CSI resource configuration and the second CSI resource configuration is in response to the capability report.

In a thirteenth additional aspect, alone or in combination with one or more of the first through twelfth aspects, process 1200 includes transmitting, to the network node, a capability report indicating whether the UE supports reception of CSI reference signals that are non-contiguous in a frequency domain.

In a fourteenth additional aspect, alone or in combination with one or more of the first through thirteenth aspects, the configuration information indicates a first power offset value associated with the full-duplex time intervals and a second power offset value associated with the downlink time intervals.

In a fifteenth additional aspect, alone or in combination with one or more of the first through fourteenth aspects, the configuration information indicates one or more CSI subbands associated with the full-duplex time intervals, and the second CSI includes information that is calculated from one or more measurements associated with the one or more CSI subbands.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
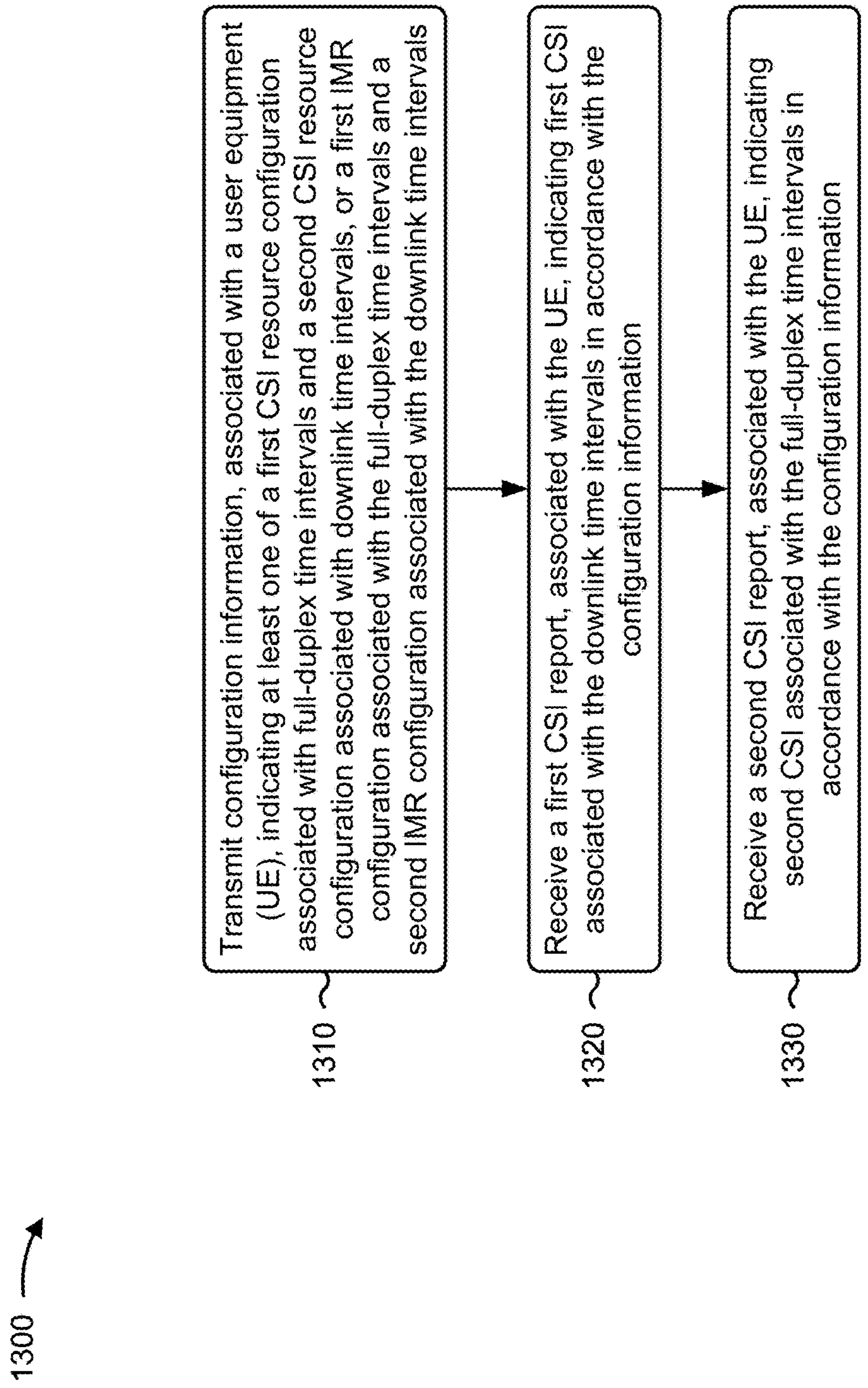
FIG. 13 is a flowchart illustrating an example process performed, for example, by a network node that supports a CSI framework for full-duplex operations in accordance with the present disclosure.

FIG. 13 is a flowchart illustrating an example process 1300 performed, for example, by a network node that supports a CSI framework for full-duplex operations in accordance with the present disclosure. Example process 1300 is an example where the network node (for example, network node 110 or network node 210) performs operations associated with a CSI framework for full-duplex operations.

As shown in FIG. 13, in some aspects, process 1300 may include transmitting configuration information, associated with a UE, indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals (block 1310). For example, the network node (such as by using communication manager 150 or transmission component 1504, depicted in FIG. 15) may transmit configuration information, associated with a UE, indicating at least one of: a first CSI resource configuration associated with full-duplex time intervals and a second CSI resource configuration associated with downlink time intervals, or a first IMR configuration associated with the full-duplex time intervals and a second IMR configuration associated with the downlink time intervals, as described above.

As further shown in FIG. 13, in some aspects, process 1300 may include receiving a first CSI report, associated with the UE, indicating first CSI associated with the downlink time intervals in accordance with the configuration information (block 1320). For example, the network node (such as by using communication manager 150 or reception component 1502, depicted in FIG. 15) may receive a first CSI report, associated with the UE, indicating first CSI associated with the downlink time intervals in accordance with the configuration information, as described above.

As further shown in FIG. 13, in some aspects, process 1300 may include receiving a second CSI report, associated with the UE, indicating second CSI associated with the full-duplex time intervals in accordance with the configuration information (block 1330). For example, the network node (such as by using communication manager 150 or reception component 1502, depicted in FIG. 15) may receive a second CSI report, associated with the UE, indicating second CSI associated with the full-duplex time intervals in accordance with the configuration information, as described above.

Process 1300 may include additional aspects, such as any single aspect or any combination of aspects described below or in connection with one or more other processes described elsewhere herein.

In a first additional aspect, process 1300 includes receiving a measurement report indicating one or more cross-link interference measurement values associated with the UE, the configuration information being selected in association with the one or more cross-link interference measurement values.

In a second additional aspect, alone or in combination with the first aspect, the configuration information indicates a common CSI resource configuration associated with both the full-duplex time intervals and the downlink time intervals, the first IMR configuration, and the second IMR configuration.

In a third additional aspect, alone or in combination with one or more of the first and second aspects, process 1300 includes transmitting a CSI-RS indicated by the common CSI resource configuration, transmitting, during a full-duplex time interval, a first IMR indicated by the first IMR configuration, and transmitting, during a downlink time interval, a second IMR indicated by the second IMR configuration, where the first CSI includes information calculated using a measurement of the CSI-RS and a measurement of the second IMR, and where the second CSI includes information calculated using the measurement of the CSI-RS and a measurement of the first IMR.

In a fourth additional aspect, alone or in combination with one or more of the first through third aspects, the configuration information indicates the first CSI resource configuration, the second CSI resource configuration, and a common IMR configuration for both the full-duplex time intervals and the downlink time intervals.

In a fifth additional aspect, alone or in combination with one or more of the first through fourth aspects, process 1300 includes transmitting a first CSI-RS indicated by the first CSI resource configuration, transmitting a second CSI-RS indicated by the second CSI resource configuration, and transmitting an IMR indicated by the common IMR configuration, where the first CSI includes information calculated using a measurement of the second CSI-RS and a measurement of the IMR, and where the second CSI includes information calculated using a measurement of the first CSI-RS and the measurement of the IMR.

In a sixth additional aspect, alone or in combination with one or more of the first through fifth aspects, process 1300 includes transmitting a first CSI-RS indicated by the first CSI resource configuration, transmitting a second CSI-RS indicated by the second CSI resource configuration, transmitting, during a full-duplex time interval, a first IMR indicated by the first IMR configuration, and transmitting, during a downlink time interval, a second IMR indicated by the second IMR configuration, where the first CSI includes information calculated using a measurement of the second CSI-RS and a measurement of the second IMR, and where the second CSI includes information calculated using a measurement of the first CSI-RS and a measurement of the first IMR.

In a seventh additional aspect, alone or in combination with one or more of the first through sixth aspects, the first CSI resource configuration indicates a first one or more beamforming parameters and the second CSI resource configuration indicates a second one or more beamforming parameters.

In an eighth additional aspect, alone or in combination with one or more of the first through seventh aspects, the first CSI resource configuration indicates a set of resources associated with a first CSI-RS and the second CSI resource configuration indicates a subset of resources, from the set of resources, associated with the first CSI-RS.

In a ninth additional aspect, alone or in combination with one or more of the first through eighth aspects, the set of resources includes a set of CSI-RS ports.

In a tenth additional aspect, alone or in combination with one or more of the first through ninth aspects, the set of resources includes an array of CSI-RS ports and the configuration information indicates the subset of resources via an array size and an offset indicating a subset of CSI-RS ports from the array of CSI-RS ports.

In an eleventh additional aspect, alone or in combination with one or more of the first through tenth aspects, the configuration information indicates the subset of resources via an index of a row in a CSI-RS location table.

In a twelfth additional aspect, alone or in combination with one or more of the first through eleventh aspects, process 1300 includes receiving a capability report indicating that the UE supports being configured with separate CSI configurations for the full-duplex time intervals and the downlink time intervals, the configuration information including the first CSI resource configuration and the second CSI resource configuration is in response to the capability report.

In a thirteenth additional aspect, alone or in combination with one or more of the first through twelfth aspects, process 1300 includes receiving a capability report indicating whether the UE supports reception of CSI reference signals that are non-contiguous in a frequency domain.

In a fourteenth additional aspect, alone or in combination with one or more of the first through thirteenth aspects, the configuration information indicates a first power offset value associated with the full-duplex time intervals and a second power offset value associated with the downlink time intervals.

In a fifteenth additional aspect, alone or in combination with one or more of the first through fourteenth aspects, the configuration information indicates one or more CSI subbands associated with the full-duplex time intervals, and the second CSI includes information that is calculated from one or more measurements associated with the one or more CSI subbands.

Although FIG. 13 shows example blocks of process 1300, in some aspects, process 1300 may include additional blocks, fewer blocks, different blocks, or differently arranged blocks than those depicted in FIG. 13. Additionally or alternatively, two or more of the blocks of process 1300 may be performed in parallel.

Figure 14:
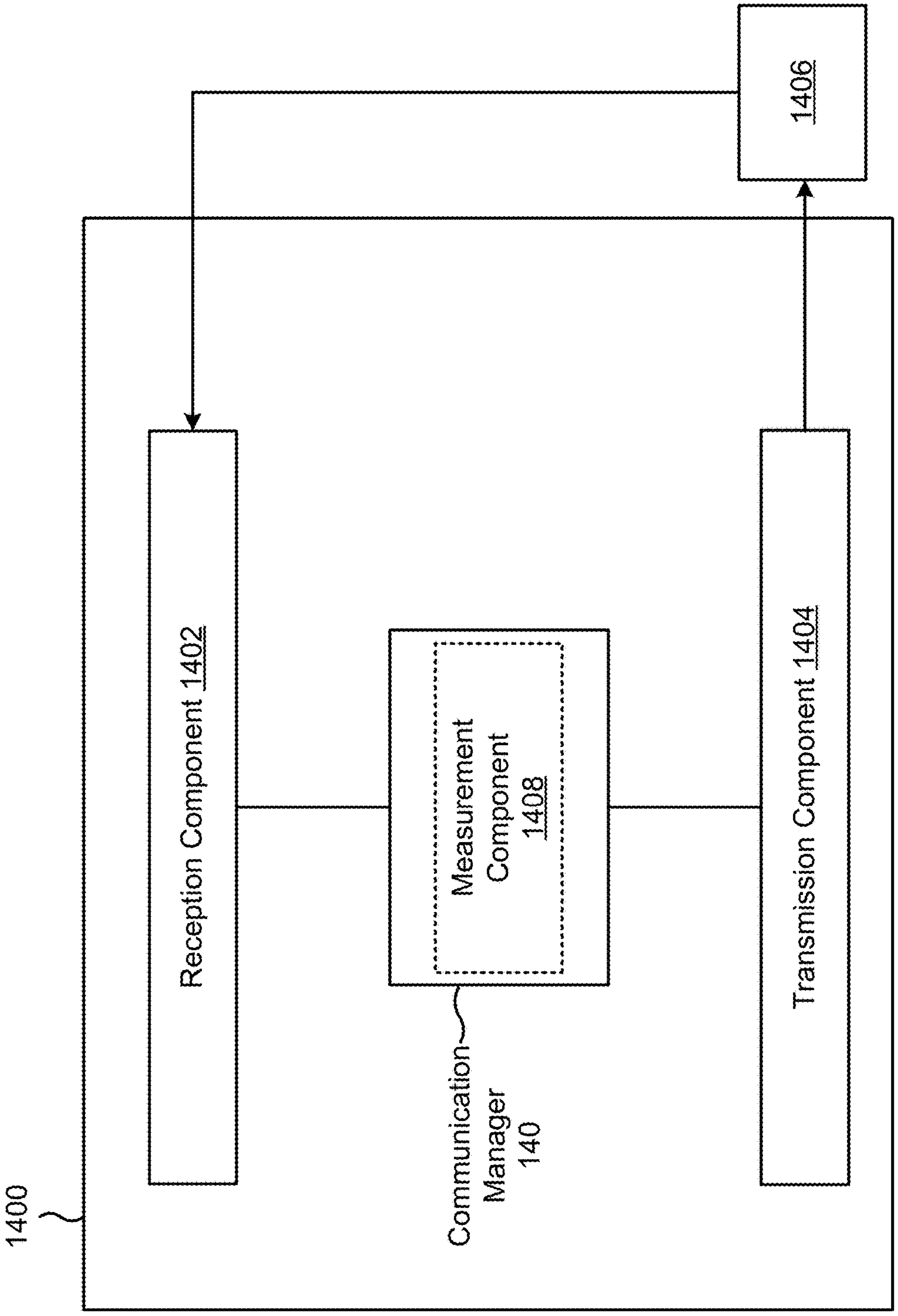
FIG. 14 is a diagram of an example apparatus for wireless communication that supports a CSI framework for full-duplex operations in accordance with the present disclosure.

FIG. 14 is a diagram of an example apparatus 1400 for wireless communication that supports a CSI framework for full-duplex operations in accordance with the present disclosure. The apparatus 1400 may be a UE, or a UE may include the apparatus 1400. In some aspects, the apparatus 1400 includes a reception component 1402, a transmission component 1404, and a communication manager 140, which may be in communication with one another (for example, via one or more buses). As shown, the apparatus 1400 may communicate with another apparatus 1406 (such as a UE, a network node, or another wireless communication device) using the reception component 1402 and the transmission component 1404.

In some aspects, the apparatus 1400 may be configured to and/or operable to perform one or more operations described herein in connection with FIG. 9-11. Additionally or alternatively, the apparatus 1400 may be configured to and/or operable to perform one or more processes described herein, such as process 1200 of FIG. 12. In some aspects, the apparatus 1400 may include one or more components of the UE described above in connection with FIG. 2.

The reception component 1402 may receive communications, such as reference signals, control information, and/or data communications, from the apparatus 1406. The reception component 1402 may provide received communications to one or more other components of the apparatus 1400, such as the communication manager 140. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a modem, a demodulator, a MIMO detector, a receive processor, a controller/processor, and/or a memory of the UE described above in connection with FIG. 2.

The transmission component 1404 may transmit communications, such as reference signals, control information, and/or data communications, to the apparatus 1406. In some aspects, the communication manager 140 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, and/or a memory of the UE described above in connection with FIG. 2. In some aspects, the transmission component 1404 may be co-located with the reception component 1402 in a transceiver.

The communication manager 140 may receive or may cause the reception component 1402 to receive, from a network node, configuration information indicating at least one of a first CSI resource configuration associated with full-duplex time intervals and a second CSI resource configuration associated with downlink time intervals, or a first IMR configuration associated with the full-duplex time intervals and a second IMR configuration associated with the downlink time intervals. The communication manager 140 may transmit or may cause the transmission component 1404 to transmit, to the network node, a first CSI report indicating first CSI associated with the downlink time intervals in accordance with the configuration information. The communication manager 140 may transmit or may cause the transmission component 1404 to transmit, to the network node, a second CSI report indicating second CSI associated with the full-duplex time intervals in accordance with the configuration information. In some aspects, the communication manager 140 may perform one or more operations described elsewhere herein as being performed by one or more components of the communication manager 140.

The communication manager 140 may include a controller/processor, a memory, of the UE described above in connection with FIG. 2. In some aspects, the communication manager 140 includes a set of components, such as a measurement component 1408. Alternatively, the set of components may be separate and distinct from the communication manager 140. In some aspects, one or more components of the set of components may include or may be implemented within a controller/processor, a memory, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive, from a network node, configuration information indicating at least one of a first CSI resource configuration associated with full-duplex time intervals and a second CSI resource configuration associated with downlink time intervals, or a first IMR configuration associated with the full-duplex time intervals and a second IMR configuration associated with the downlink time intervals. The transmission component 1404 may transmit, to the network node, a first CSI report indicating first CSI associated with the downlink time intervals in accordance with the configuration information. The transmission component 1404 may transmit, to the network node, a second CSI report indicating second CSI associated with the full-duplex time intervals in accordance with the configuration information.

The transmission component 1404 may transmit, to the network node, a measurement report indicating one or more cross-link interference measurement values, the configuration information being configured in association with the one or more cross-link interference measurement values.

The measurement component 1408 may measure a CSI-RS indicated by the common CSI resource configuration. The measurement component 1408 may measure, during a full-duplex time interval, a first IMR indicated by the first IMR configuration. The measurement component 1408 may measure, during a downlink time interval, a second IMR indicated by the second IMR configuration, where the first CSI includes information calculated using the measurement of the CSI-RS and the measurement of the second IMR, and where the second CSI includes information calculated using the measurement of the CSI-RS and the measurement of the first IMR.

The measurement component 1408 may measure a first CSI-RS indicated by the first CSI resource configuration. The measurement component 1408 may measure a second CSI-RS indicated by the second CSI resource configuration. The measurement component 1408 may measure an IMR indicated by the common IMR configuration, where the first CSI includes information calculated using the measurement of the second CSI-RS and the measurement of the IMR, and where the second CSI includes information calculated using the measurement of the first CSI-RS and the measurement of the IMR.

The measurement component 1408 may measure a first CSI-RS indicated by the first CSI resource configuration. The measurement component 1408 may measure a second CSI-RS indicated by the second CSI resource configuration. The measurement component 1408 may measure, during a full-duplex time interval, a first IMR indicated by the first IMR configuration. The measurement component 1408 may measure, during a downlink time interval, a second IMR indicated by the second IMR configuration, where the first CSI includes information calculated using the measurement of the second CSI-RS and the measurement of the second IMR, and where the second CSI includes information calculated using the measurement of the first CSI-RS and the measurement of the first IMR.

The transmission component 1404 may transmit, to the network node, a capability report indicating that the UE supports being configured with separate CSI configurations for the full-duplex time intervals and the downlink time intervals where the configuration information including the first CSI resource configuration and the second CSI resource configuration is in response to the capability report.

The transmission component 1404 may transmit, to the network node, a capability report indicating whether the UE supports reception of CSI reference signals that are non-contiguous in a frequency domain.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
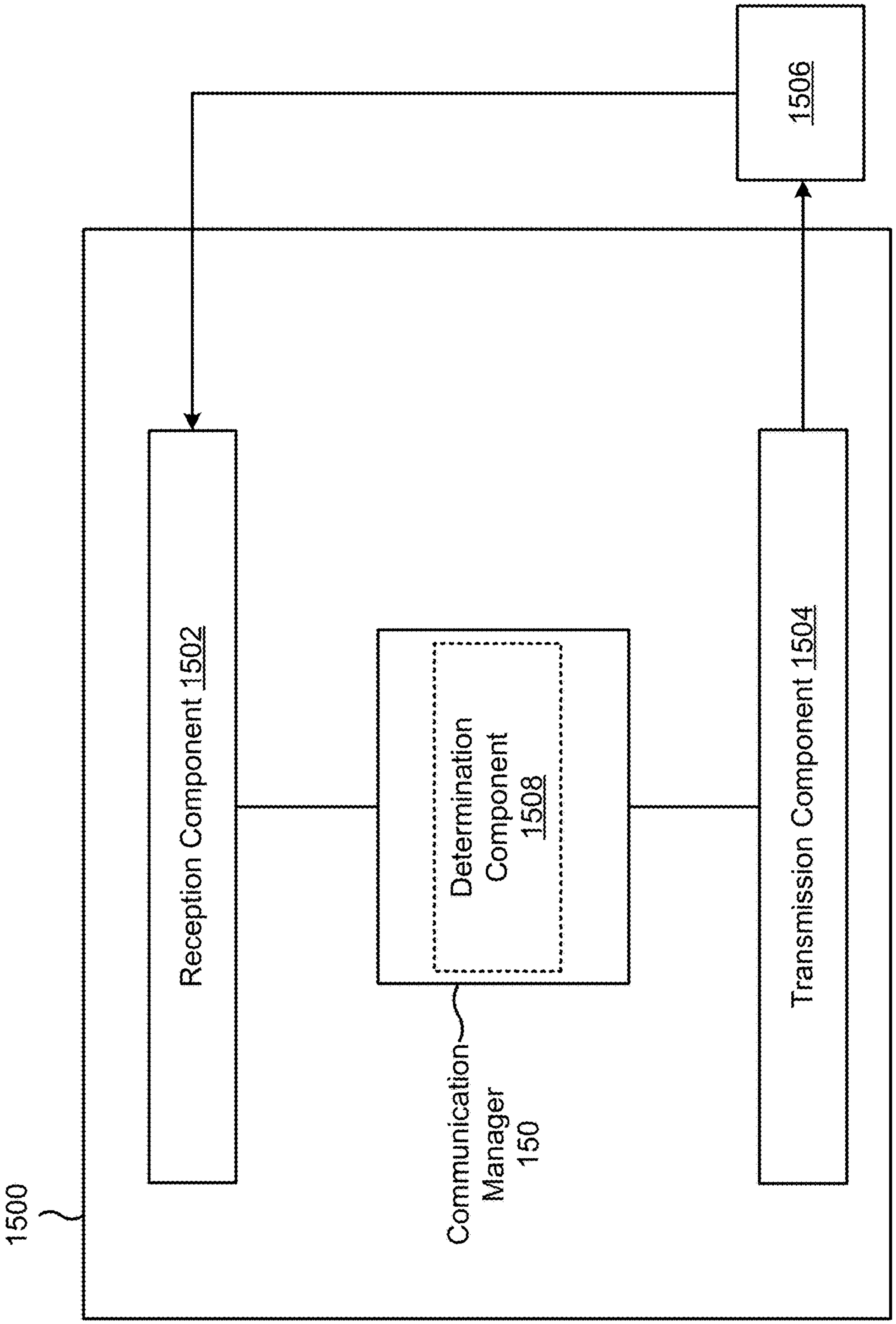
FIG. 15 is a diagram of an example apparatus for wireless communication that supports a CSI framework for full-duplex operations in accordance with the present disclosure.

FIG. 15 is a diagram of an example apparatus 1500 for wireless communication that supports a CSI framework for full-duplex operations in accordance with the present disclosure. The apparatus 1500 may be a network node, or a network node may include the apparatus 1500. In some aspects, the apparatus 1500 includes a reception component 1502, a transmission component 1504, and a communication manager 150, which may be in communication with one another (for example, via one or more buses). As shown, the apparatus 1500 may communicate with another apparatus 1506 (such as a UE, a network node, or another wireless communication device) using the reception component 1502 and the transmission component 1504.

In some aspects, the apparatus 1500 may be configured to and/or operable to perform one or more operations described herein in connection with FIG. 9-11. Additionally or alternatively, the apparatus 1500 may be configured to and/or operable to perform one or more processes described herein, such as process 1300 of FIG. 13. In some aspects, the apparatus 1500 may include one or more components of the network node described above in connection with FIG. 2.

The reception component 1502 may receive communications, such as reference signals, control information, and/or data communications, from the apparatus 1506. The reception component 1502 may provide received communications to one or more other components of the apparatus 1500, such as the communication manager 150. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a modem, a demodulator, a MIMO detector, a receive processor, a controller/processor, and/or a memory of the network node described above in connection with FIG. 2.

The transmission component 1504 may transmit communications, such as reference signals, control information, and/or data communications, to the apparatus 1506. In some aspects, the communication manager 150 may generate communications and may transmit the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, and/or a memory of the network node described above in connection with FIG. 2. In some aspects, the transmission component 1504 may be co-located with the reception component 1502 in a transceiver.

The communication manager 150 may transmit or may cause the transmission component 1504 to transmit configuration information, associated with a UE, indicating at least one of a first CSI resource configuration associated with full-duplex time intervals and a second CSI resource configuration associated with downlink time intervals, or a first IMR configuration associated with the full-duplex time intervals and a second IMR configuration associated with the downlink time intervals. The communication manager 150 may receive or may cause the reception component 1502 to receive a first CSI report, associated with the UE, indicating first CSI associated with the downlink time intervals in accordance with the configuration information. The communication manager 150 may receive or may cause the reception component 1502 to receive a second CSI report, associated with the UE, indicating second CSI associated with the full-duplex time intervals in accordance with the configuration information. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a determination component 1508. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1504 may transmit configuration information, associated with a UE, indicating at least one of a first CSI resource configuration associated with full-duplex time intervals and a second CSI resource configuration associated with downlink time intervals, or a first IMR configuration associated with the full-duplex time intervals and a second IMR configuration associated with the downlink time intervals. The reception component 1502 may receive a first CSI report, associated with the UE, indicating first CSI associated with the downlink time intervals in accordance with the configuration information. The reception component 1502 may receive a second CSI report, associated with the UE, indicating second CSI associated with the full-duplex time intervals in accordance with the configuration information.

The determination component 1508 may determine the configuration information. The determination component 1508 may determine the configuration information based on, or otherwise associated with, an antenna configuration of the apparatus 1500, an RF chain configuration of the apparatus 1500, and/or CLI conditions associated with the UE.

The reception component 1502 may receive a measurement report indicating one or more cross-link interference measurement values associated with the UE, the configuration information being selected in association with the one or more cross-link interference measurement values.

The transmission component 1504 may transmit a CSI-RS indicated by the common CSI resource configuration. The transmission component 1504 may transmit, during a full-duplex time interval, a first IMR indicated by the first IMR configuration. The transmission component 1504 may transmit, during a downlink time interval, a second IMR indicated by the second IMR configuration, where the first CSI includes information calculated using a measurement of the CSI-RS and a measurement of the second IMR, and where the second CSI includes information calculated using the measurement of the CSI-RS and a measurement of the first IMR.

The transmission component 1504 may transmit a first CSI-RS indicated by the first CSI resource configuration. The transmission component 1504 may transmit a second CSI-RS indicated by the second CSI resource configuration. The transmission component 1504 may transmit an IMR indicated by the common IMR configuration, where the first CSI includes information calculated using a measurement of the second CSI-RS and a measurement of the IMR, and where the second CSI includes information calculated using a measurement of the first CSI-RS and the measurement of the IMR.

The transmission component 1504 may transmit a first CSI-RS indicated by the first CSI resource configuration. The transmission component 1504 may transmit a second CSI-RS indicated by the second CSI resource configuration. The transmission component 1504 may transmit, during a full-duplex time interval, a first IMR indicated by the first IMR configuration. The transmission component 1504 may transmit, during a downlink time interval, a second IMR indicated by the second IMR configuration, where the first CSI includes information calculated using a measurement of the second CSI-RS and a measurement of the second IMR, and where the second CSI includes information calculated using a measurement of the first CSI-RS and a measurement of the first IMR.

The reception component 1502 may receive a capability report indicating that the UE supports being configured with separate CSI configurations for the full-duplex time intervals and the downlink time intervals where the configuration information including the first CSI resource configuration and the second CSI resource configuration is in response to the capability report.

The reception component 1502 may receive a capability report indicating whether the UE supports reception of CSI reference signals that are non-contiguous in a frequency domain.

The quantity and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving, from a network node, configuration information indicating at least one of: a first channel state information (CSI) resource configuration associated with full-duplex time intervals and a second CSI resource configuration associated with downlink time intervals, or a first interference measurement resource (IMR) configuration associated with the full-duplex time intervals and a second IMR configuration associated with the downlink time intervals; transmitting, to the network node, a first CSI report indicating first CSI associated with the downlink time intervals in accordance with the configuration information; and transmitting, to the network node, a second CSI report indicating second CSI associated with the full-duplex time intervals in accordance with the configuration information.

Aspect 2: The method of Aspect 1, further comprising: transmitting, to the network node, a measurement report indicating one or more cross-link interference measurement values, the configuration information being configured in association with the one or more cross-link interference measurement values.

Aspect 3: The method of any of Aspects 1-2, wherein the configuration information indicates a common CSI resource configuration associated with both the full-duplex time intervals and the downlink time intervals, the first IMR configuration, and the second IMR configuration.

Aspect 4: The method of Aspect 3, further comprising: measuring a CSI reference signal (CSI-RS) indicated by the common CSI resource configuration; measuring, during a full-duplex time interval, a first IMR indicated by the first IMR configuration; and measuring, during a downlink time interval, a second IMR indicated by the second IMR configuration, wherein the first CSI includes information calculated using the measurement of the CSI-RS and the measurement of the second IMR, and wherein the second CSI includes information calculated using the measurement of the CSI-RS and the measurement of the first IMR.

Aspect 5: The method of any of Aspects 1-4, wherein the configuration information indicates the first CSI resource configuration, the second CSI resource configuration, and a common IMR configuration for both the full-duplex time intervals and the downlink time intervals.

Aspect 6: The method of Aspect 5, further comprising: measuring a first CSI reference signal (CSI-RS) indicated by the first CSI resource configuration; measuring a second CSI-RS indicated by the second CSI resource configuration; and measuring an IMR indicated by the common IMR configuration, wherein the first CSI includes information calculated using the measurement of the second CSI-RS and the measurement of the IMR, and wherein the second CSI includes information calculated using the measurement of the first CSI-RS and the measurement of the IMR.

Aspect 7: The method of any of Aspects 1-6, further comprising: measuring a first CSI reference signal (CSI-RS) indicated by the first CSI resource configuration; measuring a second CSI-RS indicated by the second CSI resource configuration; measuring, during a full-duplex time interval, a first IMR indicated by the first IMR configuration; and measuring, during a downlink time interval, a second IMR indicated by the second IMR configuration, wherein the first CSI includes information calculated using the measurement of the second CSI-RS and the measurement of the second IMR, and wherein the second CSI includes information calculated using the measurement of the first CSI-RS and the measurement of the first IMR.

Aspect 8: The method of any of Aspects 1-7, wherein the first CSI resource configuration indicates a first one or more beamforming parameters and the second CSI resource configuration indicates a second one or more beamforming parameters.

Aspect 9: The method of any of Aspects 1-8, wherein the first CSI resource configuration indicates a set of resources associated with a first CSI reference signal (CSI-RS) and the second CSI resource configuration indicates a subset of resources, from the set of resources, associated with the first CSI-RS.

Aspect 10: The method of Aspect 9, wherein the set of resources includes a set of CSI-RS ports.

Aspect 11: The method of any of Aspects 9-10, wherein the set of resources includes an array of CSI-RS ports and the configuration information indicates the subset of resources via an array size and an offset indicating a subset of CSI-RS ports from the array of CSI-RS ports.

Aspect 12: The method of any of Aspects 9-11, wherein the configuration information indicates the subset of resources via an index of a row in a CSI-RS location table.

Aspect 13: The method of any of Aspects 1-12, further comprising: transmitting, to the network node, a capability report indicating that the UE supports being configured with separate CSI configurations for the full-duplex time intervals and the downlink time intervals, wherein the configuration information including the first CSI resource configuration and the second CSI resource configuration is in response to the capability report.

Aspect 14: The method of any of Aspects 1-13, further comprising: transmitting, to the network node, a capability report indicating whether the UE supports reception of CSI reference signals that are non-contiguous in a frequency domain.

Aspect 15: The method of any of Aspects 1-14, wherein the configuration information indicates a first power offset value associated with the full-duplex time intervals and a second power offset value associated with the downlink time intervals.

Aspect 16: The method of any of Aspects 1-15, wherein the configuration information indicates one or more CSI subbands associated with the full-duplex time intervals, and wherein the second CSI includes information that is calculated from one or more measurements associated with the one or more CSI subbands.

Aspect 17: A method of wireless communication performed by a network node, comprising: transmitting configuration information, associated with a user equipment (UE), indicating at least one of: a first channel state information (CSI) resource configuration associated with full-duplex time intervals and a second CSI resource configuration associated with downlink time intervals, or a first interference measurement resource (IMR) configuration associated with the full-duplex time intervals and a second IMR configuration associated with the downlink time intervals; receiving a first CSI report, associated with the UE, indicating first CSI associated with the downlink time intervals in accordance with the configuration information; and receiving a second CSI report, associated with the UE, indicating second CSI associated with the full-duplex time intervals in accordance with the configuration information.

Aspect 18: The method of Aspect 17, further comprising: receiving a measurement report indicating one or more cross-link interference measurement values associated with the UE, the configuration information being selected in association with the one or more cross-link interference measurement values.

Aspect 19: The method of any of Aspects 17-18, wherein the configuration information indicates a common CSI resource configuration associated with both the full-duplex time intervals and the downlink time intervals, the first IMR configuration, and the second IMR configuration.

Aspect 20: The method of Aspect 19, further comprising: transmitting a CSI reference signal (CSI-RS) indicated by the common CSI resource configuration; transmitting, during a full-duplex time interval, a first IMR indicated by the first IMR configuration; and transmitting, during a downlink time interval, a second IMR indicated by the second IMR configuration, wherein the first CSI includes information calculated using a measurement of the CSI-RS and a measurement of the second IMR, and wherein the second CSI includes information calculated using the measurement of the CSI-RS and a measurement of the first IMR.

Aspect 21: The method of any of Aspects 17-20, wherein the configuration information indicates the first CSI resource configuration, the second CSI resource configuration, and a common IMR configuration for both the full-duplex time intervals and the downlink time intervals.

Aspect 22: The method of Aspect 21, further comprising: transmitting a first CSI reference signal (CSI-RS) indicated by the first CSI resource configuration; transmitting a second CSI-RS indicated by the second CSI resource configuration; and transmitting an IMR indicated by the common IMR configuration, wherein the first CSI includes information calculated using a measurement of the second CSI-RS and a measurement of the IMR, and wherein the second CSI includes information calculated using a measurement of the first CSI-RS and the measurement of the IMR.

Aspect 23: The method of any of Aspects 17-22, further comprising: transmitting a first CSI reference signal (CSI-RS) indicated by the first CSI resource configuration; transmitting a second CSI-RS indicated by the second CSI resource configuration; transmitting, during a full-duplex time interval, a first IMR indicated by the first IMR configuration; and transmitting, during a downlink time interval, a second IMR indicated by the second IMR configuration, wherein the first CSI includes information calculated using a measurement of the second CSI-RS and a measurement of the second IMR, and wherein the second CSI includes information calculated using a measurement of the first CSI-RS and a measurement of the first IMR.

Aspect 24: The method of any of Aspects 17-23, wherein the first CSI resource configuration indicates a first one or more beamforming parameters and the second CSI resource configuration indicates a second one or more beamforming parameters.

Aspect 25: The method of any of Aspects 17-24, wherein the first CSI resource configuration indicates a set of resources associated with a first CSI reference signal (CSI-RS) and the second CSI resource configuration indicates a subset of resources, from the set of resources, associated with the first CSI-RS.

Aspect 26: The method of Aspect 25, wherein the set of resources includes a set of CSI-RS ports.

Aspect 27: The method of any of Aspects 25-26, wherein the set of resources includes an array of CSI-RS ports and the configuration information indicates the subset of resources via an array size and an offset indicating a subset of CSI-RS ports from the array of CSI-RS ports.

Aspect 28: The method of any of Aspects 25-27, wherein the configuration information indicates the subset of resources via an index of a row in a CSI-RS location table.

Aspect 29: The method of any of Aspects 17-28, further comprising: receiving a capability report indicating that the UE supports being configured with separate CSI configurations for the full-duplex time intervals and the downlink time intervals, wherein the configuration information including the first CSI resource configuration and the second CSI resource configuration is in response to the capability report.

Aspect 30: The method of any of Aspects 17-29, further comprising: receiving a capability report indicating whether the UE supports reception of CSI reference signals that are non-contiguous in a frequency domain.

Aspect 31: The method of any of Aspects 17-30, wherein the configuration information indicates a first power offset value associated with the full-duplex time intervals and a second power offset value associated with the downlink time intervals.

Aspect 32: The method of any of Aspects 17-31, wherein the configuration information indicates one or more CSI subbands associated with the full-duplex time intervals, and wherein the second CSI includes information that is calculated from one or more measurements associated with the one or more CSI subbands.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

Aspect 38: A device for wireless communication, comprising: a processing system that includes one or more processors and one or more memories coupled with the one or more processors, the processing system configured to cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, searching, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B)). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of").

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

a processing system that includes one or more processors and one or more memories coupled with the one or more processors, the processing system configured to cause the UE to:

receive, from a network node, configuration information indicating:

a first channel measurement resource (CMR) configuration associated with full-duplex time intervals and a second CMR configuration associated with downlink time intervals, and a first interference measurement resource (IMR) configuration associated with the full-duplex time intervals and a second IMR configuration associated with the downlink time intervals;

measure a first channel state information (CSI) reference signal (CSI-RS) indicated by the first CMR configuration;

measure a second CSI-RS indicated by the second CMR configuration;

transmit, to the network node, a first CSI report indicating first CSI associated with the downlink time intervals in accordance with the configuration information, wherein the first CSI includes information calculated using the measurement of the second CSI-RS; and transmit, to the network node, a second CSI report indicating second CSI associated with the full-duplex time intervals in accordance with the configuration information, wherein the second CSI includes information calculated using the measurement of the first CSI-RS.

2. The UE of claim 1, wherein the processing system is further configured to cause the UE to:

transmit, to the network node, a measurement report indicating one or more cross-link interference (CLI) measurement values, the configuration information being configured in association with the one or more CLI measurement values.

3. The UE of claim 1, wherein the configuration information indicates the first CMR configuration and the second CMR configuration in accordance with the network node using different antenna configurations or different radio frequency (RF) chain configurations for the full-duplex time intervals and the downlink time intervals.

4. The UE of claim 1, wherein the processing system is further configured to cause the UE to:

measure, during a full-duplex time interval, a first IMR indicated by the first IMR configuration; and measure, during a downlink time interval, a second IMR indicated by the second IMR configuration, wherein the first CSI includes information calculated using the measurement of the second IMR, and wherein the second CSI includes information calculated using the measurement of the first IMR.

5. The UE of claim 1, wherein the configuration information indicates the first IMR configuration and the second IMR configuration in accordance with one or more cross-link interference (CLI) measurement values satisfying a threshold.

6. The UE of claim 1, wherein the first CMR configuration indicates one or more first beamforming parameters and the second CMR configuration indicates one or more second beamforming parameters.

7. The UE of claim 1, wherein the first CMR configuration indicates a set of resources associated with the first CSI-RS and the second CMR configuration indicates a subset of resources, from the set of resources, associated with the first CSI-RS.

8. The UE of claim 7, wherein the set of resources includes a set of CSI-RS ports.

9. The UE of claim 7, wherein the set of resources includes an array of CSI-RS ports and the configuration information indicates the subset of resources via an array size and an offset indicating a subset of CSI-RS ports from the array of CSI-RS ports.

10. The UE of claim 7, wherein the configuration information indicates the subset of resources via an index of a row in a CSI-RS location table.

11. The UE of claim 1, wherein the processing system is further configured to cause the UE to:

transmit a capability report indicating that the UE supports being configured with separate CSI configurations for the full-duplex time intervals and the downlink time intervals, wherein the configuration information including the first CMR configuration and the second CMR configuration is in response to the capability report.

12. A network node for wireless communication, comprising:

a processing system that includes one or more processors and one or more memories coupled with the one or more processors, the processing system configured to cause the network node to:

transmit configuration information, associated with a user equipment (UE), indicating:

a first channel measurement resource (CMR) configuration associated with full-duplex time intervals and a second CMR configuration associated with downlink time intervals, and a first interference measurement resource (IMR) configuration associated with the full-duplex time intervals and a second IMR configuration associated with the downlink time intervals;

receive a first CSI report, associated with the UE, indicating first channel state information (CSI) associated with the downlink time intervals in accordance with the configuration information, wherein the first CSI includes information calculated using a measurement of a second CSI reference signal (CSI-RS) indicated by the second CMR configuration; and receive a second CSI report, associated with the UE, indicating second CSI associated with the full-duplex time intervals in accordance with the configuration information, wherein the second CSI includes information calculated using a measurement of a first CSI-RS indicated by the first CMR configuration.

13. The network node of claim 12, wherein the processing system is further configured to cause the network node to:

receive a measurement report indicating one or more cross-link interference measurement values associated with the UE, the configuration information being selected in association with the one or more cross-link interference measurement values.

14. The network node of claim 12, wherein the configuration information indicates the first CMR configuration and the second CMR configuration in accordance with the network node using different antenna configurations or different radio frequency (RF) chain configurations for the full-duplex time intervals and the downlink time intervals.

15. The network node of claim 12, wherein the configuration information indicates the first IMR configuration and the second IMR configuration in accordance with one or more cross-link interference (CLI) measurement values satisfying a threshold.

16. The network node of claim 12, wherein the first CMR configuration indicates one or more first beamforming parameters and the second CMR configuration indicates one or more second beamforming parameters.

17. The network node of claim 12, wherein the first CMR configuration indicates a set of resources associated with the first CSI-RS and the second CMR configuration indicates a subset of resources, from the set of resources, associated with the first CSI-RS.

18. A method for wireless communication by a user equipment (UE), comprising:

receiving, from a network node, configuration information indicating:

a first channel measurement resource (CMR) configuration associated with full-duplex time intervals and a second CMR configuration associated with downlink time intervals, and a first interference measurement resource (IMR) configuration associated with the full-duplex time intervals and a second IMR configuration associated with the downlink time intervals;

measuring a first channel state information (CSI) reference signal (CSI-RS) indicated by the first CMR configuration;

measuring a second CSI-RS indicated by the second CMR configuration;

transmitting, to the network node, a first channel state information (CSI) report indicating first CSI associated with the downlink time intervals in accordance with the configuration information, wherein the first CSI includes information calculated using the measurement of the second CSI-RS; and transmitting, to the network node, a second CSI report indicating second CSI associated with the full-duplex time intervals in accordance with the configuration information, wherein the second CSI includes information calculated using the measurement of the first CSI-RS.

19. The method of claim 18, further comprising:

transmitting, to the network node, a measurement report indicating one or more cross-link interference (CLI) measurement values, the configuration information being configured in association with the one or more CLI measurement values.

20. The method of claim 18, wherein the configuration information indicates the first CMR configuration and the second CMR configuration in accordance with the network node using different antenna configurations or different radio frequency (RF) chain configurations for the full-duplex time intervals and the downlink time intervals.

21. The method of claim 18, wherein the configuration information indicates the first IMR configuration and the second IMR configuration in accordance with one or more cross-link interference (CLI) measurement values satisfying a threshold.

22. The method of claim 18, further comprising:

transmitting, to the network node, a capability report indicating that the UE supports being configured with separate CSI configurations for the full-duplex time intervals and the downlink time intervals, wherein the configuration information including the first CMR configuration and the second CMR configuration is in response to the capability report.

23. The method of claim 18, further comprising:

transmitting, to the network node, a capability report indicating whether the UE supports reception of CSI reference signals that are non-contiguous in a frequency domain.

24. The method of claim 18, wherein the configuration information indicates a first power offset value associated with the full-duplex time intervals and a second power offset value associated with the downlink time intervals.

25. The method of claim 18, wherein the configuration information indicates one or more CSI subbands associated with the full-duplex time intervals, and wherein the second CSI includes information that is calculated from one or more measurements associated with the one or more CSI subbands.

26. A method for wireless communication by a network node, comprising:

transmitting configuration information, associated with a user equipment (UE), indicating:

a first channel measurement resource (CMR) configuration associated with full-duplex time intervals and a second CMR configuration associated with downlink time intervals, and a first interference measurement resource (IMR) configuration associated with the full-duplex time intervals and a second IMR configuration associated with the downlink time intervals;

receiving a first channel state information (CSI) report, associated with the UE, indicating first CSI associated with the downlink time intervals in accordance with the configuration information, wherein the first CSI includes information calculated using a measurement of a second CSI reference signal (CSI-RS) indicated by the second CMR configuration; and receiving a second CSI report, associated with the UE, indicating second CSI associated with the full-duplex time intervals in accordance with the configuration information, wherein the second CSI includes information calculated using a measurement of a first CSI-RS indicated by the first CMR configuration.

27. The method of claim 26, further comprising:

receiving a capability report indicating that the UE supports being configured with separate CSI configurations for the full-duplex time intervals and the downlink time intervals, wherein the configuration information including the first CMR configuration and the second CMR configuration is in response to the capability report.

28. The method of claim 26, further comprising:

receiving a capability report indicating whether the UE supports reception of CSI reference signals that are non-contiguous in a frequency domain.

29. The method of claim 26, wherein the configuration information indicates a first power offset value associated with the full-duplex time intervals and a second power offset value associated with the downlink time intervals.

30. The method of claim 18, further comprising:

measuring, during a full-duplex time interval, a first IMR indicated by the first IMR configuration; and measuring, during a downlink time interval, a second IMR indicated by the second IMR configuration, wherein the first CSI includes information calculated using the measurement of the second IMR, and wherein the second CSI includes information calculated using the measurement of the first IMR.

* * * * *